(12) United States Patent
Kasai

(10) Patent No.: US 9,091,311 B2
(45) Date of Patent: Jul. 28, 2015

(54) TORQUE TRANSMISSION DEVICE

(75) Inventor: Takayuki Kasai, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 427 days.

(21) Appl. No.: 13/501,129

(22) PCT Filed: Oct. 18, 2010

(86) PCT No.: PCT/JP2010/068255
§ 371 (c)(1),
(2), (4) Date: Jun. 13, 2012

(87) PCT Pub. No.: WO2011/049035
PCT Pub. Date: Apr. 28, 2011

(65) Prior Publication Data
US 2012/0286609 A1    Nov. 15, 2012

(30) Foreign Application Priority Data

Oct. 19, 2009 (JP) ................... 2009-240626
Aug. 26, 2010 (JP) ................... 2010-189080

(51) Int. Cl.
*H02K 49/00*   (2006.01)
*F16D 47/02*   (2006.01)
(Continued)

(52) U.S. Cl.
CPC ............ *F16D 47/02* (2013.01); *F16D 11/14* (2013.01); *F16D 27/01* (2013.01); *F16D 43/20* (2013.01); *H02K 49/106* (2013.01); *F16H 3/54* (2013.01); *H02K 49/10* (2013.01)

(58) Field of Classification Search
CPC ...... H02K 49/10; H02K 49/106; F16D 11/14; F16D 27/01; F16D 43/20; F16D 47/02; F16H 3/54
USPC .................... 310/78, 92, 94, 99, 103, 105
IPC ..................................... H02K 49/10
See application file for complete search history.

(56) References Cited

U.S. PATENT DOCUMENTS 2,876,878 A * 3/1959 Sinclair et al. .............. 192/69.91
5,394,131 A * 2/1995 Lungu .......................... 335/229
(Continued)

FOREIGN PATENT DOCUMENTS

JP   57-134066    8/1982
JP   2004-347027  12/2004
(Continued)

OTHER PUBLICATIONS

International Search Report issued Nov. 16, 2010 in corresponding International Application No. PCT/JP2010/068255.

*Primary Examiner* — John K Kim
(74) *Attorney, Agent, or Firm* — Wenderoth, Lind & Ponack, L.L.P.

(57) ABSTRACT

A torque transmission device includes a magnetic pole rotating body having magnetic poles arranged in a row on a circumference thereof; a yoke rotating body configured to rotate about the same center axis of rotation as the magnetic pole rotating body and including tooth-shaped portions arranged in a row so as to oppose the magnetic poles; and a side magnetic body formed of a magnetic material provided on the side of the tooth-shaped portions of the yoke rotating body, wherein the magnetic pole rotating body and the yoke rotating body are supported so as to be rotatable about the direction of center axis of rotation and so as to allow the magnetic poles and the side magnetic body to be relatively movable in the direction toward and away from each other along the center axis of rotation.

11 Claims, 20 Drawing Sheets

(51) Int. Cl.
*F16D 11/14* (2006.01)
*F16D 27/01* (2006.01)
*F16D 43/20* (2006.01)
*H02K 49/10* (2006.01)
*F16H 3/54* (2006.01)

(56) References Cited

U.S. PATENT DOCUMENTS 6,043,578 A * 3/2000 Lamb .............................. 310/92
6,501,357 B2 * 12/2002 Petro ............................ 335/229
6,682,430 B2 * 1/2004 Killen ............................ 464/29
2004/0021384 A1 * 2/2004 Six ................................ 310/103
2009/0120756 A1 * 5/2009 Mercer ........................ 192/84.3
2012/0286609 A1 * 11/2012 Kasai ............................ 310/94

FOREIGN PATENT DOCUMENTS

| JP | 2008-247548 | 10/2008 |
| JP | 2008-248903 | 10/2008 |
| JP | 2008-249006 | 10/2008 |
| JP | 2009-236209 | 10/2009 |

* cited by examiner

Fig. 3
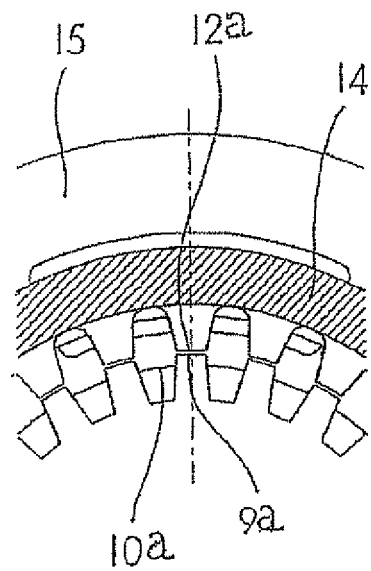
(a)
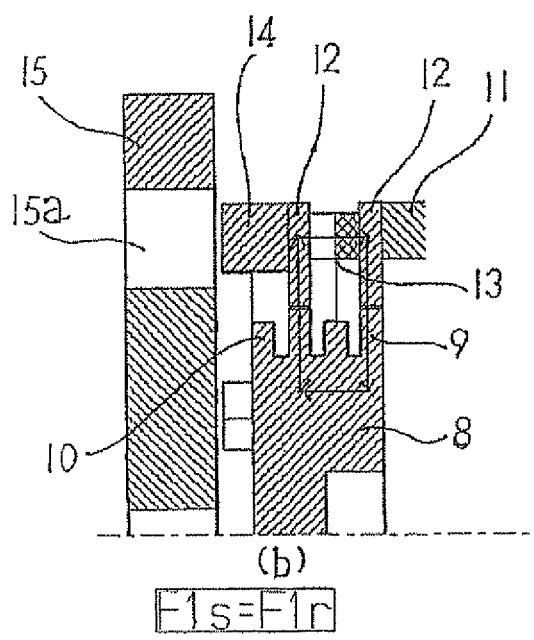
(b)
F1s=F1r

Fig. 4
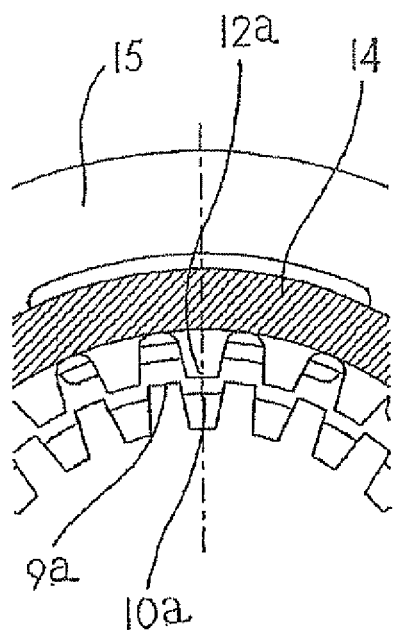
(a)
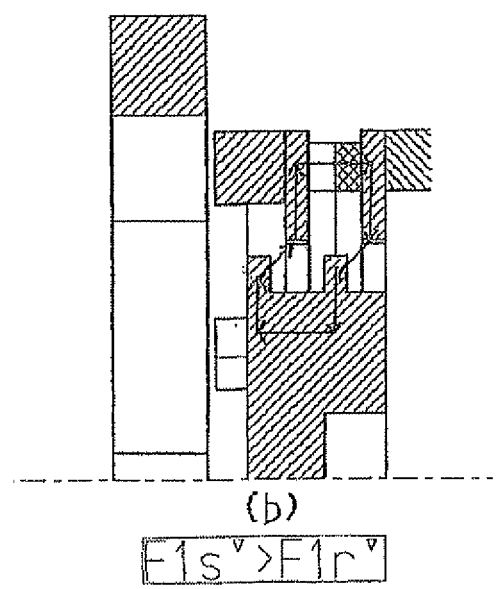
(b)
$F1s^v > F1r^v$

Fig. 6
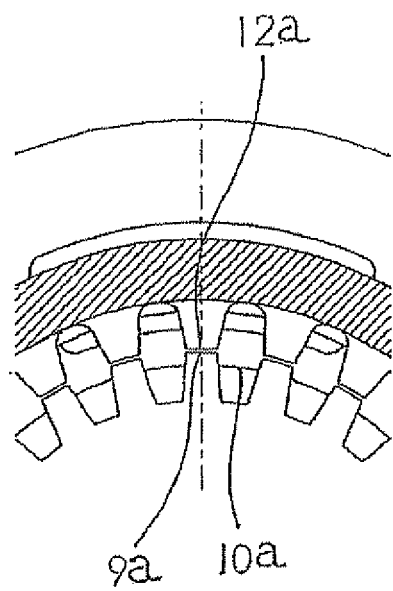
(a)
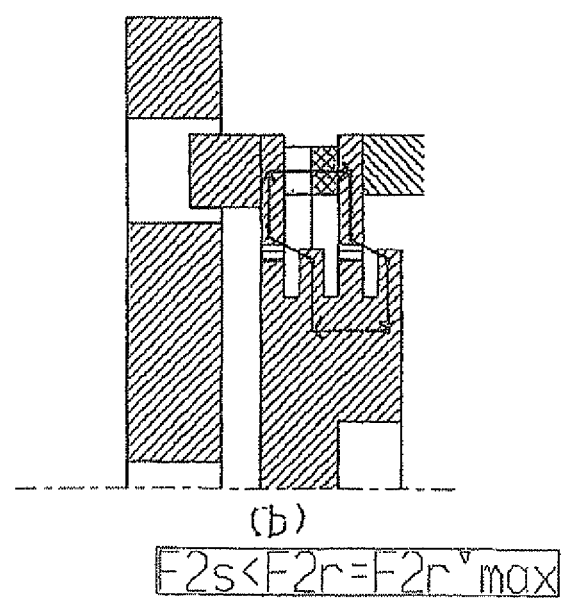
(b)
$$F2s < F2r = F2r\ max$$

(a)　　　　　(b)

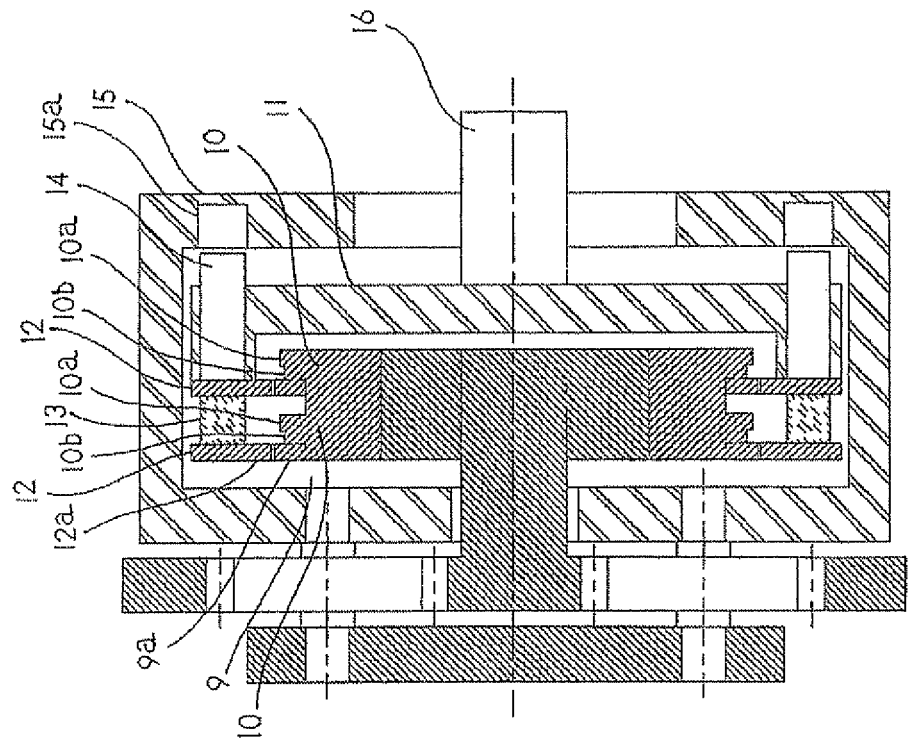
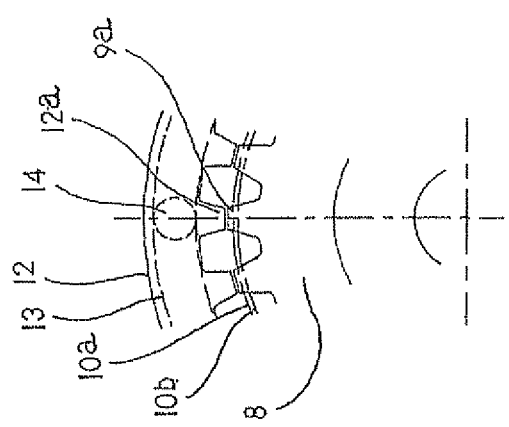
Fig. 17

US 9,091,311 B2

TORQUE TRANSMISSION DEVICE

TECHNICAL FIELD

The present invention relates to a torque transmission device configured to transmit a rotating torque by a magnetic attracting force between two rotating bodies.

BACKGROUND ART

In the related art, a device configured to transmit a rotating force by a magnetic coupling is proposed (Patent Document 1, FIG. 2(c)).

In the above described Patent Document, a mechanism which transmits a rotating force efficiently by magnetic attracting forces of a number of magnetic poles is proposed. However, when a load torque exceeding a magnetic coupling force is applied to the torque transmission device, idle running is resulted. However, in order to detect the presence or absence of the idling, a complicated detecting mechanism is required for detecting the difference in rotation between two rotating bodies.

A non-contact load-sensing automatic transmission configured to perform a switching operation of a magnetic clutch magnetically according to the load is also proposed (Patent Document 2).

The non-contact load-sensing automatic transmission includes input means from a decelerator, a rotating body rotatably coupled to the input means, magnetic bodies fixed to the rotating body with positions of axial directions shifted from each other, a speed switching member including a magnet for a magnetic clutch which is capable of opposing the respective magnetic bodies via a gap and provided so as to be movable in the axial direction and a rotation-thrust converting mechanism configured to change the relative position in the direction of rotation with the speed switching member according to a load applied to an output side and to move the speed switching member in the axial direction by the change of the relative position in the direction of rotation, wherein the rotation-thrust conversion mechanism is configured to change the speed of the output means by switching repulsive and attractive operations between a magnet provided on the speed switching member and a magnet provided on an output side member on the basis of the change in relative position in the direction of rotation according to the load, and moving the speed switching member in the axial direction by the switching to cause the magnet for the magnetic clutch to oppose any one of the magnetic bodies of the rotating body. Therefore, the structure is complicated, the switching operation is unstable, and downsizing is difficult.

Patent Document 1: JP-A-57-134066
Patent Document 2: JP-A-2004-347027

SUMMARY OF THE INVENTION

Problem to be Solved by the Invention

It is an object of the present invention to provide a torque transmission device configured to transmit a rotating torque by a magnetic attracting force between two rotating bodies and having a simple configuration in which the rotating bodies are automatically caused to make a sliding movement in the direction of axis of rotation by an operation of the magnetic attracting force when a load torque exceeding a rotating torque transmissible by the magnetic attracting force is applied.

It is another object of the present invention to provide a torque transmission device including a magnetic clutch mechanism configured to switch a rotating torque transmitting route on the basis of the magnitude of the load torque by using an operation of sliding movement of the rotating bodies.

Means for Solving the Problems

The present invention solves the above-described problem, and includes: a magnetic pole rotating body having magnetic poles arranged in a row on a circumference thereof a yoke rotating body configured to rotate about the same center axis of rotation as the magnetic pole rotating body and including tooth-shaped portions arranged in a row so as to oppose the magnetic poles and a side magnetic body formed of a magnetic material provided on the side of the tooth-shaped portions of the yoke rotating body, and is characterized in the magnetic pole rotating body and the yoke rotating body are supported so as to be rotatable about the direction of center axis of rotation and so as to allow the magnetic poles and the side magnetic body to be relatively movable in the direction toward and away from each other along the center axis of rotation, and when a load torque exceeding a transmission torque transmissible by a magnetic attracting force that is applied between the magnetic pole rotating body and the yoke rotating body is applied between the both, the both rotating bodies relatively rotate and a coupling force applied between the opposed magnetic poles and the tooth-shaped portions is weakened, so that a component in the direction of the axis of rotation of the magnetic attracting force applied between the magnetic poles and the side magnetic body becomes greater than a component in the direction of axis of rotation of the magnetic attracting force applied to the magnetic pole rotating body and the tooth-shaped portion, and the both rotating bodies move relatively to positions where the magnetic poles move getting closer to the side magnetic body along the center axis of rotation.

Also, the invention is characterized in that when the load torque applied to the magnetic pole rotating body and the yoke rotating body is reduced to a level lower than the magnetic attracting force applied between the magnetic poles and the yoke rotating body, the both rotating bodies move relatively to positions where the magnetic poles oppose the tooth-shaped portions of the yoke rotating body.

Also, the invention is characterized in the side magnetic body includes a circumferential surface concentric with a circumferential surface formed by distal ends of the tooth-shaped portions of the yoke rotating body and, when a load torque exceeding the rotating torque transmissible by the magnetic attracting force is applied between the magnetic pole rotating body and the yoke rotating body, the magnetic poles move relatively to positions opposing the circumferential surface of the side magnetic body along the center axis of rotation.

Also, the invention is characterized in plural sets of a row of the magnetic poles of the magnetic pole rotating body, a row of the tooth-shaped portions of the yoke rotating body, and a row of the side magnetic bodies are provided, respectively.

Also, the invention is characterized in that the magnetic poles of the magnetic pole rotating body are arranged so as to oppose an outer peripheries of the tooth-shaped portions of the yoke rotating body.

Also, the invention is characterized in the magnetic pole rotating body includes the hollow disks having tooth portions arranged on inner circumference thereof at regular intervals a hollow disk-shaped permanent magnet secured between a pair of hollow disks and arranged so that distal ends of the tooth portions of one of the pair of hollow disks becomes a row of N-poles and distal ends of the other one of those becomes a row of S-poles.

Also, the invention is characterized in that the tooth-shaped portions of the yoke rotating body are arranged so as to oppose an outer periphery of the magnetic pole rotating body.

Also, the invention is characterized in that one of the magnetic pole rotating body and the yoke rotating body is set to be output rotating means which is movable in the direction of the same center axis of rotation, the other one of the rotating bodies is set to be low torque input rotating means, and a high-torque input means is provided, the high-torque input means being configured to engage the output rotating means so as to be capable of transmitting the torque and to transmit the torque exceeding the transmission torque transmissible by the magnetic attracting force by the operation of the output rotating means moving in the direction of center axis of rotation when a load torque exceeding the transmission torque transmissible by the magnetic attracting force is applied between the output rotating means and the low torque input rotating means.

Also, the invention is characterized in that the output rotating means and the high-torque input means are configured to engage by a claw clutch.

The invention is characterized in that a carrier of a planetary gear mechanism is coupled to the high-torque input means and a sun gear shaft of the planetary gear mechanism is coupled to a low-torque input means.

Also, the invention is characterized in that a small-diameter side magnetic body having a diameter smaller than the side magnetic body is provided between the tooth-shaped portions of the yoke rotating body and the side magnetic body.

Also, the invention is characterized in that at least one side magnetic body is a large-diameter side magnetic body having a diameter larger than the diameter of the tooth-shaped portions of the yoke rotating body.

Advantages of the Invention

The invention includes a magnetic pole rotating body having magnetic poles arranged in a row on a circumference thereof; a yoke rotating body configured to rotate about the same center axis of rotation as the magnetic pole rotating body and including tooth-shaped portions arranged in a row so as to oppose the magnetic poles; and a side magnetic body formed of a magnetic material provided on the side of the tooth-shaped portions of the yoke rotating body, characterized in that the magnetic pole rotating body and the yoke rotating body are supported so as to be rotatable about the direction of center axis of rotation and so as to allow the magnetic poles and the side magnetic body to be relatively movable in the direction toward and away from each other along the center axis of rotation, and when a load torque exceeding a transmission torque transmissible by a magnetic attracting force that is applied between the magnetic pole rotating body and the yoke rotating body is applied between the both, the both rotating bodies relatively rotate and a coupling force applied between the opposed magnetic poles and the tooth-shaped portions is weakened, so that a component in the direction of the axis of rotation of the magnetic attracting force applied between the magnetic poles and the side magnetic body becomes greater than a component in the direction of axis of rotation of the magnetic attracting force applied to the magnetic pole rotating body and the tooth-shaped portion, and the both rotating bodies move relatively to positions where the magnetic poles move getting closer to the side magnetic body along the center axis of rotation. Therefore, when a load torque exceeding a preset value is applied between the magnetic pole rotating body and the yoke rotating body, switching of the magnetic clutch can be performed automatically by the sliding of the magnetic pole rotating body, and since there is no need to provide a thrust conversion mechanism as a separate member as in the related art, reduction in size and weight is enabled with a smaller number of components and a simple structure and hence the product cost can be reduced significantly.

Also, when the load torque applied to the magnetic pole rotating body and the yoke rotating body is reduced to a level lower than the magnetic attracting force applied between the magnetic pole and the yoke rotating body, the both rotating bodies move relatively to positions where the magnetic poles oppose the tooth-shaped portions of the yoke rotating body and the rotation can be switched to the low-load rotation. Therefore, the restoration switching of the magnetic clutch can be performed automatically in association with the reduction of the load torque.

Also, the side magnetic body includes a circumferential surface concentric with a circumferential surface formed by distal ends of the tooth-shaped portions of the yoke rotating body and, when a load torque exceeding the rotating torque transmissible by the magnetic attracting force is applied between the magnetic pole rotating body and the yoke rotating body, the magnetic poles move relatively to positions opposing the circumferential surface of the side magnetic body along the center axis of rotation, so that the magnetic clutch can be switched to the high-load rotation. Therefore, it is not necessary to provide a stopper which restricts the magnetic poles and the side magnetic body from coming into tight contact with each other, and hence the number of components is small and the reduction in size and weight is enabled with a simple structure.

Since plural sets of a row of the magnetic poles of the magnetic pole rotating body, a row of the tooth-shaped portions of the yoke rotating body, and a row of the side magnetic bodies are provided, respectively, the torque transmissible by the magnetism can be increased as needed without increasing the radius of the rotating body, so that the reduction in size of the entire device is enabled.

Also, since the magnetic poles of the magnetic pole rotating body are arranged so as to oppose an outer peripheries of the tooth-shaped portions of the yoke rotating body, a permanent magnet which constitutes the magnetic poles may be configured to be a permanent magnet larger than that having the magnetic poles on the inner periphery, so that the torque transmissible between the magnetic pole rotating body and the yoke rotating body can be increased.

Also, the invention is configured in such a manner that a high-torque input means is provided, the high-torque input means being configured to engage the output rotating means so as to be capable of transmitting the torque and to transmit the torque exceeding the rotating torque transmissible by the magnetic attracting force when a load torque exceeding the rotating torque transmissible by the magnetic attracting force is applied between the output rotating means and the low torque input rotating means. Therefore, when a load torque exceeding the set rotating torque is applied, the output rotating means is slid by a predetermined amount in the direction of center axis of rotation so that the transmission of the rotating torque can be switched from routes of the output rotating means and the low-torque rotating means to a route of the high-torque rotating means with a simple structure, so that the reduction in size of the device, the reliability of switching operation, and the reduction of the cost are enabled.

Since the output rotating means and the high-torque input means are configured to be engaged by the claw clutch, the switching of transmission to the high-torque rotating means can be enabled simply and reliably.

Since a carrier of a planetary gear mechanism is coupled to the high-torque input means and a sun gear shaft of the planetary gear mechanism is coupled to a low-torque input means, the output rotation of the torque transmission device can be switched automatically from the low-speed (the same speed as the high-torque input means) rotation to the high-speed rotation on the basis of the magnitude of the load torque without using the electric control means.

Also, since at least one side magnetic body is a large-diameter side magnetic body having a diameter larger than the diameter of the tooth-shaped portions of the yoke rotating body, for example, the switching of the magnetic clutch can be achieved by one side magnetic body with respect to the two tooth-shaped magnetic bodies so that the number of components of the side magnetic body can be reduced.

BRIEF DESCRIPTION OF DRAWINGS

FIG. 3 is an explanatory drawing showing a switching operation of the torque transmitting apparatus according to the present invention.

FIG. 4 is an explanatory drawing showing a switching operation of the torque transmitting apparatus according to the present invention.

FIG. 6 is an explanatory drawing showing a switching operation of the torque transmitting apparatus according to the present invention.

FIG. 17 depicts a general configuration drawing of a mode in which two each of the side magnetic bodies are provided on the side of the tooth-shaped magnetic body, and depicts an explanatory drawing showing the positions of tooth-shaped portions and the side magnetic bodies.

BEST MODES FOR CARRYING OUT THE INVENTION

Embodiment 1

Referring now to FIG. 1 to FIG. 10, a first embodiment of a load-sensing automatic transmission applied with a torque transmission device according to the present invention will be described.

Figure 1:
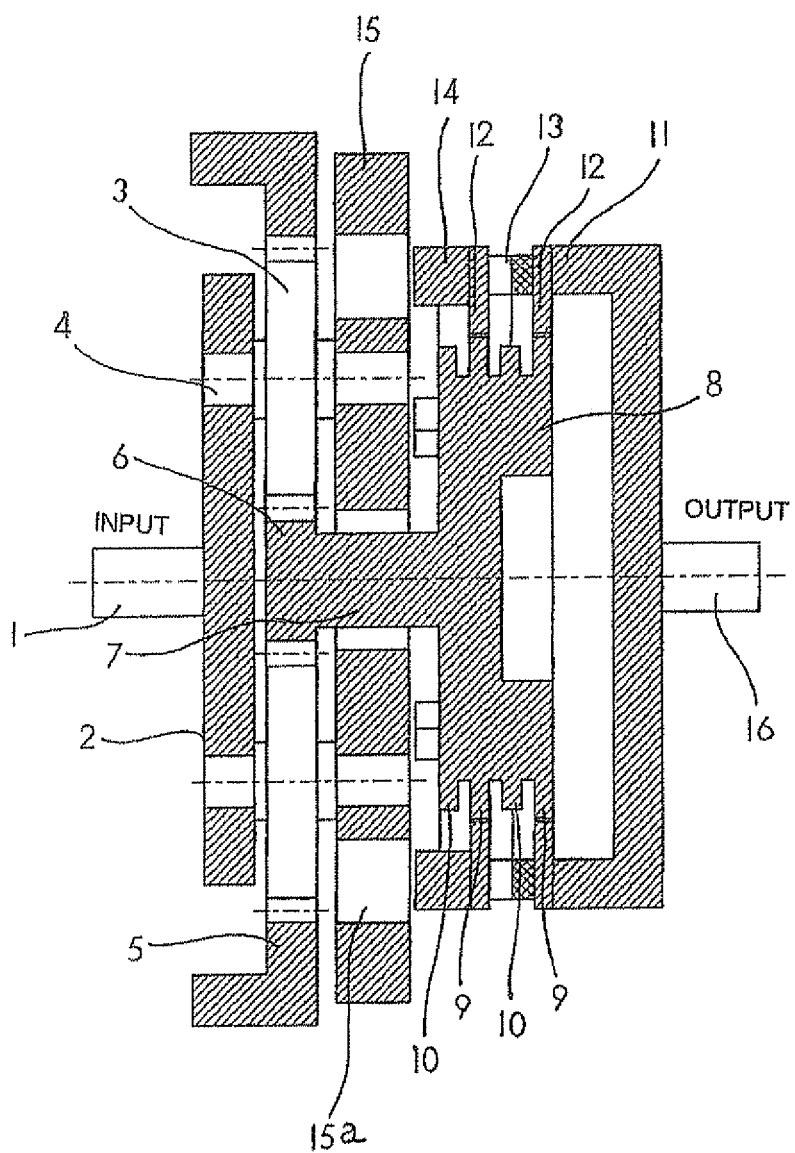
FIG. 1 is a general configuration drawing of a magnetic clutch apparatus using a torque transmission device according to the present invention.
Figure 2:
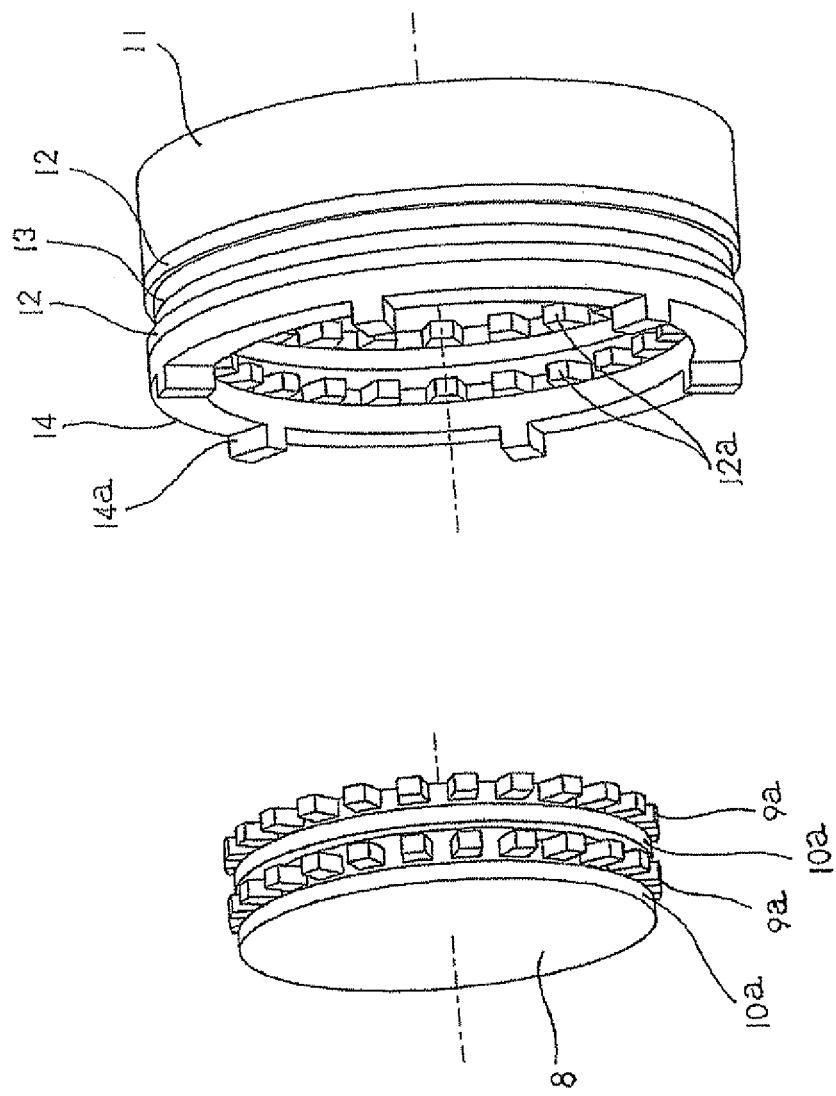
FIG. 2 is an explanatory drawing showing an exploded state of input rotating means and output rotating means.
Figure 5:
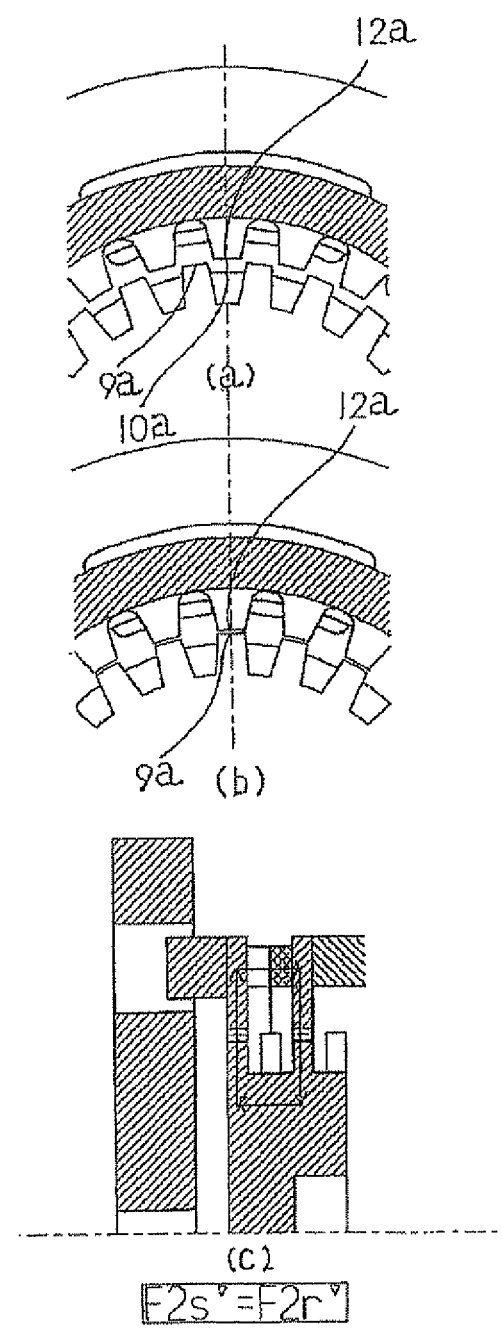
FIG. 5 is an explanatory drawing showing a switching operation of the torque transmitting apparatus according to the present invention.

In FIG. 1, reference numeral 1 designates an input shaft, reference numeral 2 designates a carrier fixed to the input shaft 1, reference numeral 3 designates a planetary gear fitted to the shaft of a gear shaft 4 provided on the carrier 2, reference numeral 5 designates a ring gear which allows engagement of the planetary gear 3 to engage in an internal contact therewith, reference numeral 6 designates a sun gear provided on a sun gear shaft 7, the planetary gear 3 engages the sun gear 6 in an external contact therewith and the ring gear 5 described above in an internal contact therewith to increase the speed of the rotation of the carrier 2 and rotates the sun gear shaft 7 at the increased speed. Reference numeral 8 designates low-torque input means coupled to the sun gear shaft 7 and, as shown in FIG. 2, includes yoke rotating bodies 9 having tooth-shaped portions 9a formed of a soft magnetic material and side magnetic bodies 10 provided on the side surface of the yoke rotating bodies 9 with a slight gap provided therebetween and formed of a circular-shaped portions 10a having a smaller diameter than the yoke rotating bodies 9.

Reference numeral 11 designates output rotating means, including a pair of magnetic pole rotating bodies 12, 12 to be coupled to the yoke rotating bodies 9 of low-torque input means at the time of a low-load high-speed rotating body, and a permanent magnet 13 provided between the pair of magnetic pole rotating bodies 12, 12, and includes a claw clutch engaging projection 14 at an end of the magnetic pole rotating body 12. Reference numeral 16 designates an output shaft fixed to the output rotating means 11. The magnetic pole rotating body 12 includes a tooth-shaped portions 12a configured to be magnetically coupled to the tooth-shaped portions 9a of the yoke rotating body 9 and the circular-shaped portions 10a of the side magnetic bodies 10, and the claw clutch engaging projection 14 includes engaging portions 14a configured to engage power transmitting grooves 15a of high-torque input means 15 at the time of a high-load rotating. The high-torque input means 15 is coupled to the carrier 2 of a planetary gear mechanism fixed to the input shaft 1, and rotates at the same low speed as the input shaft 1.

Subsequently, a switching operation of the magnetic clutch mechanism of the present invention will be described.

Figure 7:
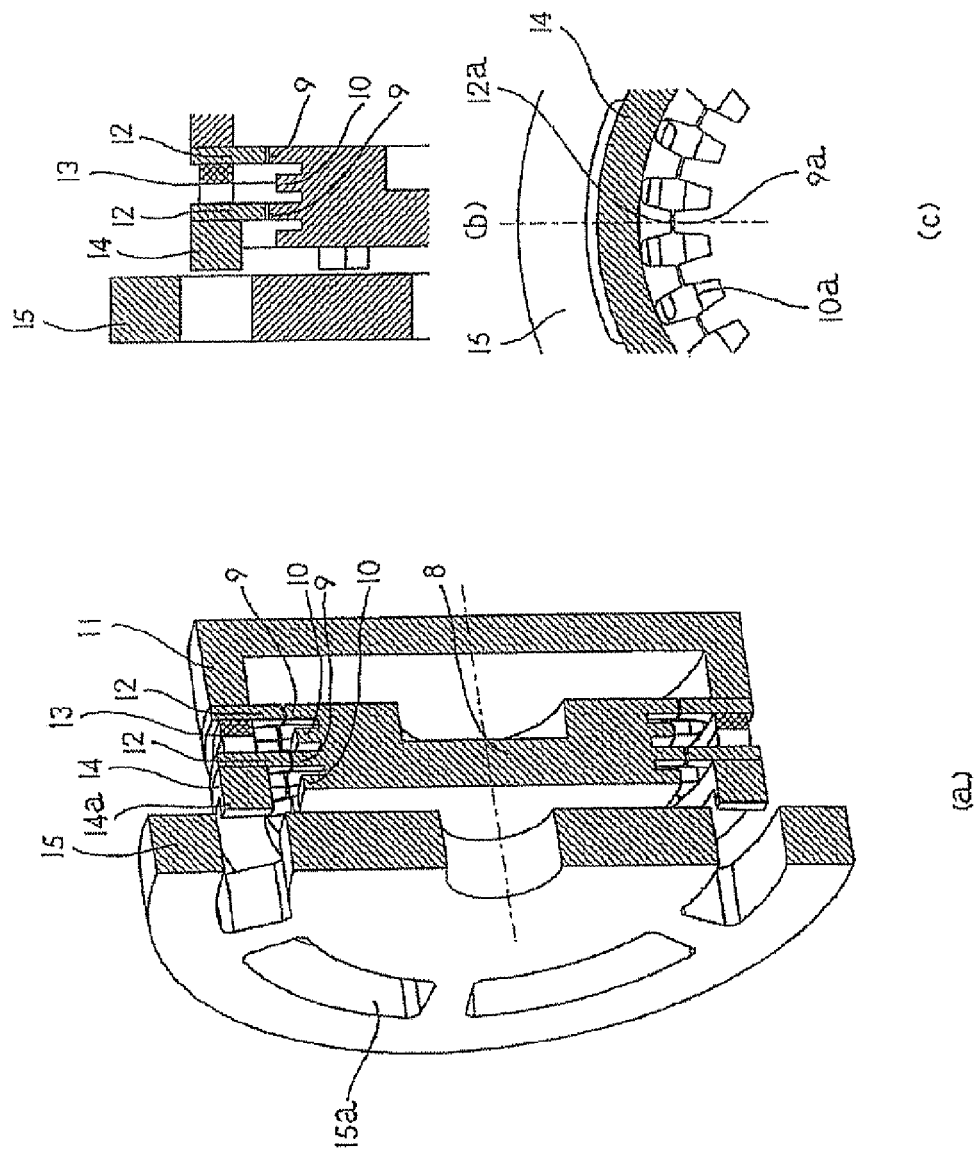
FIG. 7 depicts a general cross-sectional view at the time of low-load high-speed rotation in (a), and depicts explanatory drawings showing a state of magnetic coupling between the low-torque input means and the magnetic poles in (b) and (c).
Figure 8:
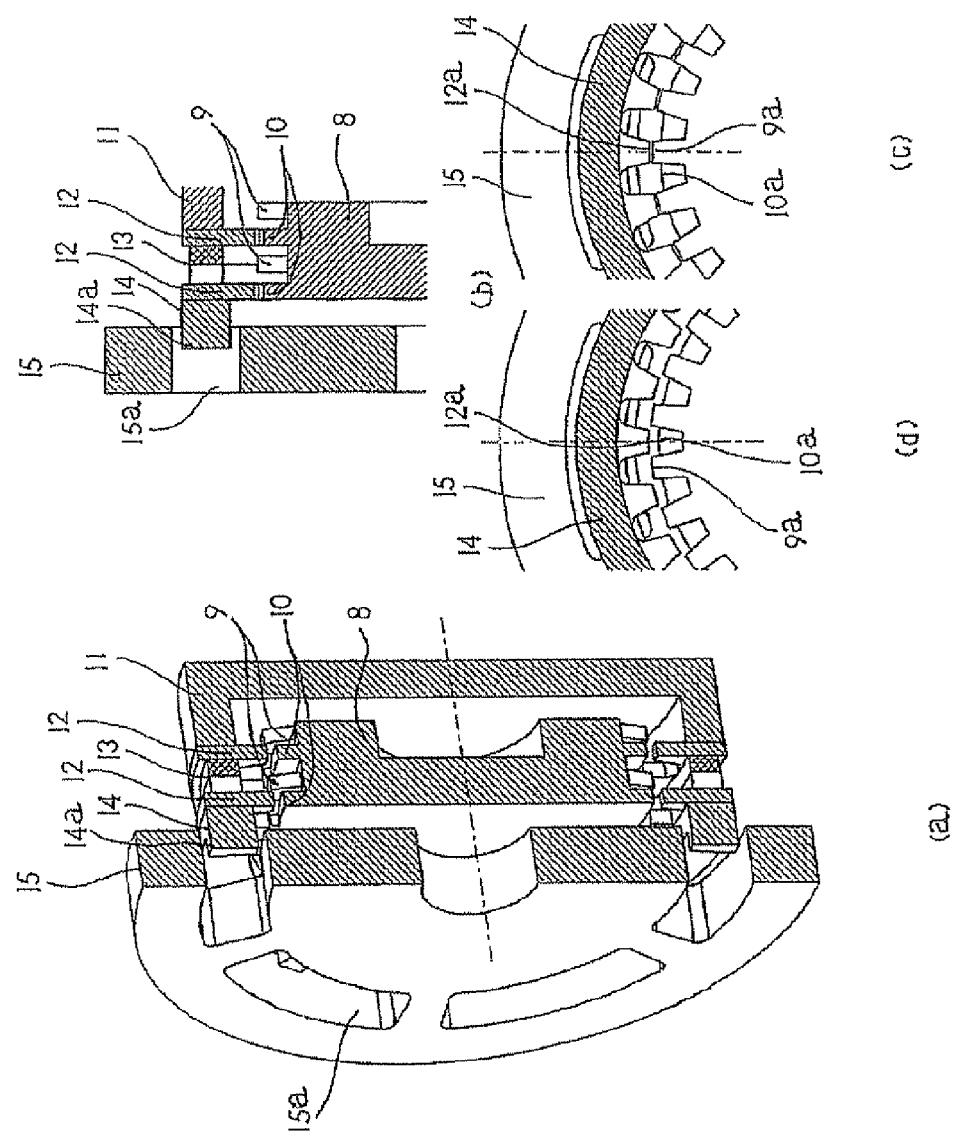
FIG. 8 depicts a general cross-sectional view showing the time of high-load rotation in (a), and depicts explanatory drawings showing a relative position between the low-torque input means and the magnetic poles in (b), (c) and (d).

FIG. 3 to FIG. 6 shows a process of a power transmission switching operation of the torque transmission device of the present invention, and a state of coupling between the low-torque input means 8 and the output rotating means 11 at the time of the low-load high-speed rotation is shown in FIG. 7 and that at the time of the high-load rotation is shown in FIG. 8.

As shown in FIG. 3 and FIG. 7, at the time of low-load high-speed rotation, the tooth-shaped portions 9a of the yoke rotating bodies 9 of the low-torque input means 8 and the tooth-shaped portions 12a of the magnetic pole rotating bodies 12 of the output rotating means 11 are in an opposed state, and the magnetic pole rotating bodies 12 and the yoke rotating bodies 9 excited by the permanent magnet 13 form magnetic circuits shown in FIG. 3(b) via a gap between the tooth-shaped portions 12a, 9a of the both, and a strong magnetic attracting force is generated between the both rotating means.

In this state, as shown in (b) of FIG. 3, a component force F1r in the direction of the center axis of rotation of the magnetic attracting force by the magnetic force of the magnetic pole rotating bodies 12 and the yoke rotating bodies 9 is in a balanced state with a component force F1s in the direction of center axis of rotation of the magnetic attracting force between the magnetic pole rotating bodies 12 and the side magnetic bodies 10, and the yoke rotating bodies 9 and the magnetic pole rotating bodies 12 maintain a state shown in (b) of FIG. 3 and (b) of FIG. 7, transmit a torque from the yoke rotating bodies 9 to the magnetic pole rotating bodies 12, and rotate the magnetic pole rotating bodies 12 at a high-speed.

Subsequently, when the load torque is increased and the load torque exceeds the magnetic attracting force between the yoke rotating bodies 9 and the magnetic pole rotating bodies 12, the low-torque input means 8 and the output rotating means 11 relatively rotate and magnetic circuits formed between the tooth-shaped portions 12a, 9a of the magnetic pole rotating bodies 12 and the yoke rotating bodies 9 are displaced to magnetic circuits flowing in the circular-shaped portions 10a of the side magnetic bodies 10, so that the component force in the direction of the center axis of rotation of the magnetic attracting force between the magnetic pole rotating bodies 12 and the yoke rotating bodies 9 is reduced from F1r to F1r'. In contrast, the component force F1s in the direction of center axis of rotation of the magnetic attracting force by the magnetic force of the magnetic pole rotating bodies 12 and the side magnetic bodies 10 is increased from F1s to F1s'. When the component force F1s' in the direction of center axis of rotation of the magnetic attracting force by the magnetic force of the magnetic pole rotating bodies 12 and the side magnetic bodies 10 is increased to a level greater than the component force F1r' of the direction of center axis of rotation of the magnetic attracting force by the magnetic force between the magnetic pole rotating bodies 12 and the yoke rotating bodies 9, the magnetic pole rotating bodies 12 slide in the direction of center axis of rotation, the relative positions between the magnetic pole rotating bodies 12 and the yoke rotating bodies 9 are displaced, the magnetic circuits are formed between the tooth-shaped portions 12a of the magnetic pole rotating bodies 12 and the circular-shaped portions 10a of the side magnetic bodies 10, and the claw clutch engaging projection 14 engages the high-torque input means 15 which rotates at the same speeds as the input shaft 1 and is switched to the high-load rotation.

Figure 10:
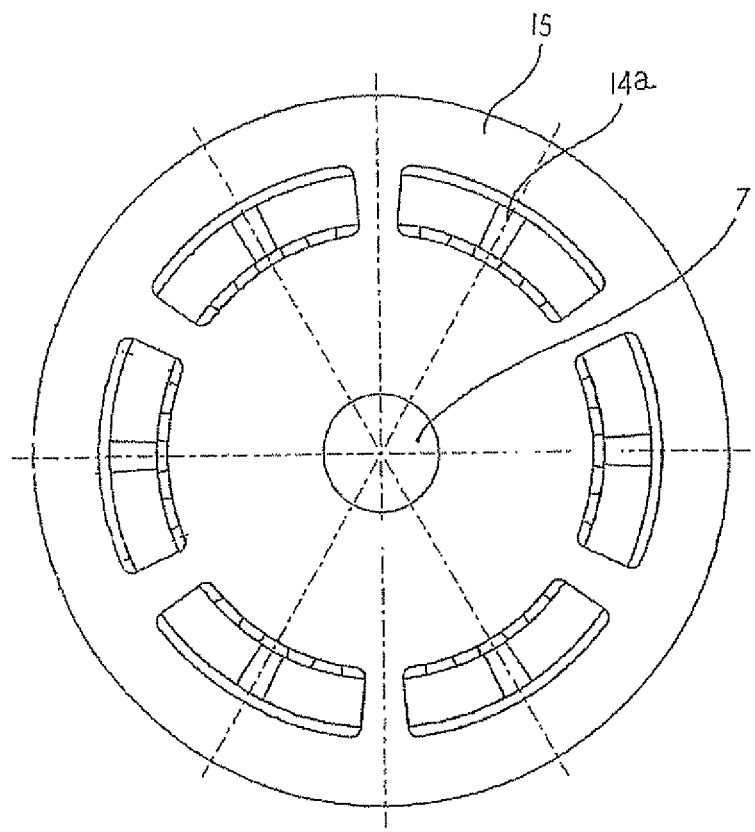
FIG. 10 is an explanatory drawing showing a configuration of high-torque input means and the claw clutch.

When the magnetic pole rotating bodies 12 slide and rotate in a state of opposing the circular-shaped portions 10a of the side magnetic bodies 10, as shown in FIG. 8 and FIG. 10, the engaging portions 14a of the claw clutch 14 engage the torque transmitting grooves 15a of the high-torque input means 15, transmit a torque to the magnetic pole rotating bodies 12 via the claw clutch 14, and rotate the output rotating means 11.

At the time of this high-load rotation, the magnetic pole rotating bodies 12 and the yoke rotating bodies 9 rotate relatively and continuously and, as shown in (c) of FIG. 8, a greatest thrust force is generated between the tooth-shaped portions 12a, 9a of the magnetic pole rotating bodies 12 and the yoke rotating bodies 9 when the tooth-shaped portions 12a, 9a of the magnetic pole rotating bodies 12 and the yoke rotating bodies 9 oppose to each other, and as shown in (d) of FIG. 8, the thrust force is minimized when the crests of the magnetic pole rotating bodies 12 and the troughs of the yoke rotating bodies 9 oppose to each other.

Figure 9:
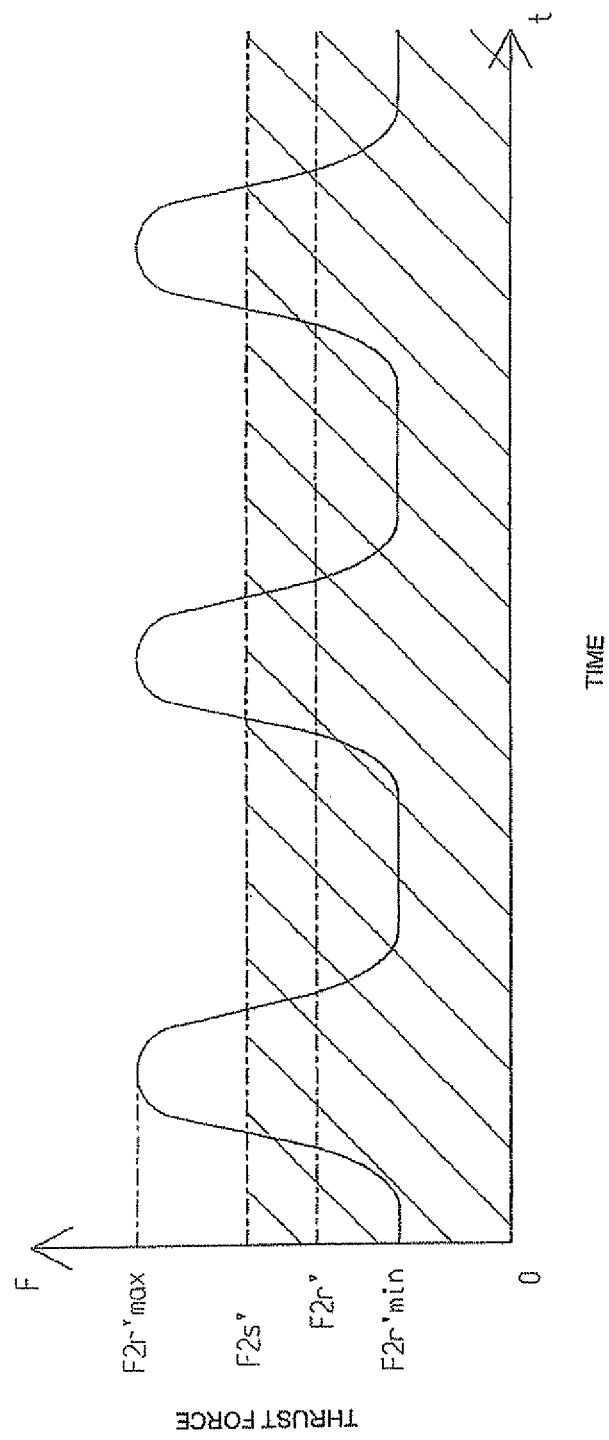
FIG. 9 is an explanatory drawing showing a relation between a magnetic attracting force and a thrust force which act on the magnetic poles at the time of high-load rotation.

Variations in thrust force generated between the magnetic pole rotating bodies 12 and the tooth-shaped portions 9a of the yoke rotating bodies 9 occur alternately between a maximum component force F2r'max in the direction of center axis of rotation of the magnetic attracting force at the time when the tooth-shaped portions 12a of the magnetic pole rotating bodies 12 oppose the tooth-shaped magnetic bodies 9a of the yoke rotating bodies 9 as shown in FIG. 9 and a minimum component force F2r'min in the direction of center axis of rotation of the magnetic attracting force at the time when the tooth-shaped portions 12a of the magnetic pole rotating bodies 12 and troughs formed of the tooth-shaped magnetic bodies 9a of the yoke rotating bodies 9 oppose to each other. However, since the both relatively rotate while the load exceeds a predetermined amount, an average thrust force F2r', which is an average thrust force of the values of a variables (see FIG. 9), does not exceed the component force F2s' in the direction of center axis of rotation generated by the magnetism between the magnetic pole rotating bodies 12 and the side magnetic bodies 10 and hence the high-load rotation is maintained in the state of FIG. 5.

Subsequently, when the load is reduced, as shown in (a) of FIG. 6, the tooth-shaped portions 12a and 9a of the magnetic pole rotating bodies 12 and the yoke rotating bodies 9 are magnetically attracted by each other, and the positions in the circumferential direction match (get close). Therefore, the magnetic circuits formed between the tooth-shaped portions 12a and the circular-shaped portions 10a of the magnetic pole rotating bodies 12 and the side magnetic bodies 10 as shown in (b) of FIG. 6 are switched to magnetic circuits flowing through the tooth-shaped portions 9a of the yoke rotating bodies 9. Accordingly, the component force F2r in the direction of center axis of rotation of the magnetic attracting force between the magnetic pole rotating bodies 12 and the yoke rotating bodies 9 is increased, the component force F2s in the direction of center axis of rotation of the magnetic attracting force between the magnetic pole rotating bodies 12 and the side magnetic bodies 10 is decreased, so that the component force F2r in the direction of center axis of rotation of the magnetic attracting force between the magnetic pole rotating bodies 12 and the yoke rotating bodies 9 exceeds the component force F2s described above and hence a returning thrust force is generated, which causes the magnetic pole rotating bodies 12 to slide to position opposing the yoke rotating bodies 9, thereby the low-load high-speed state shown in (b) of FIG. 3 is obtained.

As described above, according to the present invention, the device is configured to switch the clutch by causing the magnetic pole rotating bodies 12 to slide using a thrust force generated by the relative rotation between the magnetic pole rotating bodies 12 and the yoke rotating bodies 9 by a load applied to the magnetic pole rotating bodies 12. Therefore, the thrust conversion mechanism, which has been needed in the device of the related art, does not have to be provided separately, so that the number of components is reduced, the structure becomes simple, and reduction in size and weight is enabled, and hence the product cost can be reduced significantly. Also, the device is configured to cause the claw clutch engaging projection 14 provided on the magnetic pole rotating body 12 to engage the high-torque input means 15 by a thrust force generated by the relative rotation of the magnetic pole rotating bodies 12 and the yoke rotating bodies 9 at the time of high-load. Therefore, the torque transmission device which achieves power transmission reliably even at the time of high-load, and which is capable of switching the clutch at a high response is provided.

Second Embodiment

Figure 11:
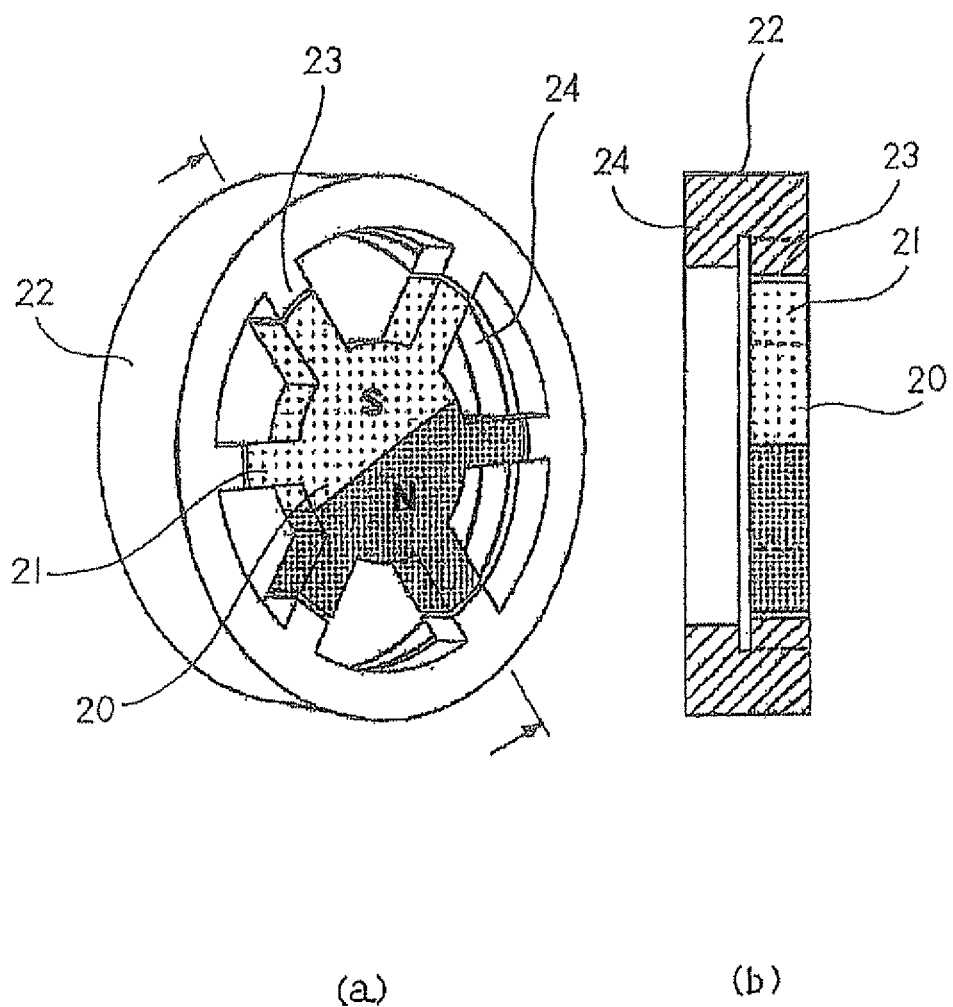
FIG. 11 depicts a general drawing showing another mode of the torque transmission device in (a), and depicts a cross-sectional view in (b) viewed in the direction of arrows in (a) of FIG. 11.

FIG. 11 shows another mode of the torque transmission device of the present invention.

In FIG. 11, a magnetic pole rotating body 20 having magnetic pole tooth-shaped portions 21 on the inside thereof and a yoke rotating body 22 having tooth-shaped portions 23 on the outside thereof are rotatably supported, for example, by the rotation supporting means as shown in the first embodiment and either one of those is supported so as to be slidable in the direction of center axis of rotation.

A side magnetic body 24 having a circumferential surface being arranged at a distance in the radial direction wider than the width between the magnetic pole tooth-shaped portions 21 and the tooth-shaped portions 23 is secured to the side of the tooth-shaped portions 23. In FIG. 11, the tooth-shaped portions 23 and the inner peripheral portion of the side magnetic body 24 are provided at a distance, the side magnetic body 24 may be secured directly to the side surfaces of the tooth-shaped portions 23.

The magnetic pole rotating body 20 is supported in such a manner that the magnetic pole tooth-shaped portions 21 are relatively slidable in the direction of center axis of rotation from positions opposing the tooth-shaped portions 23 of the yoke rotating body 22 (the position shown in the drawing) to positions opposing the peripheral surface of the side magnetic body 24.

Third Embodiment

Figure 12:
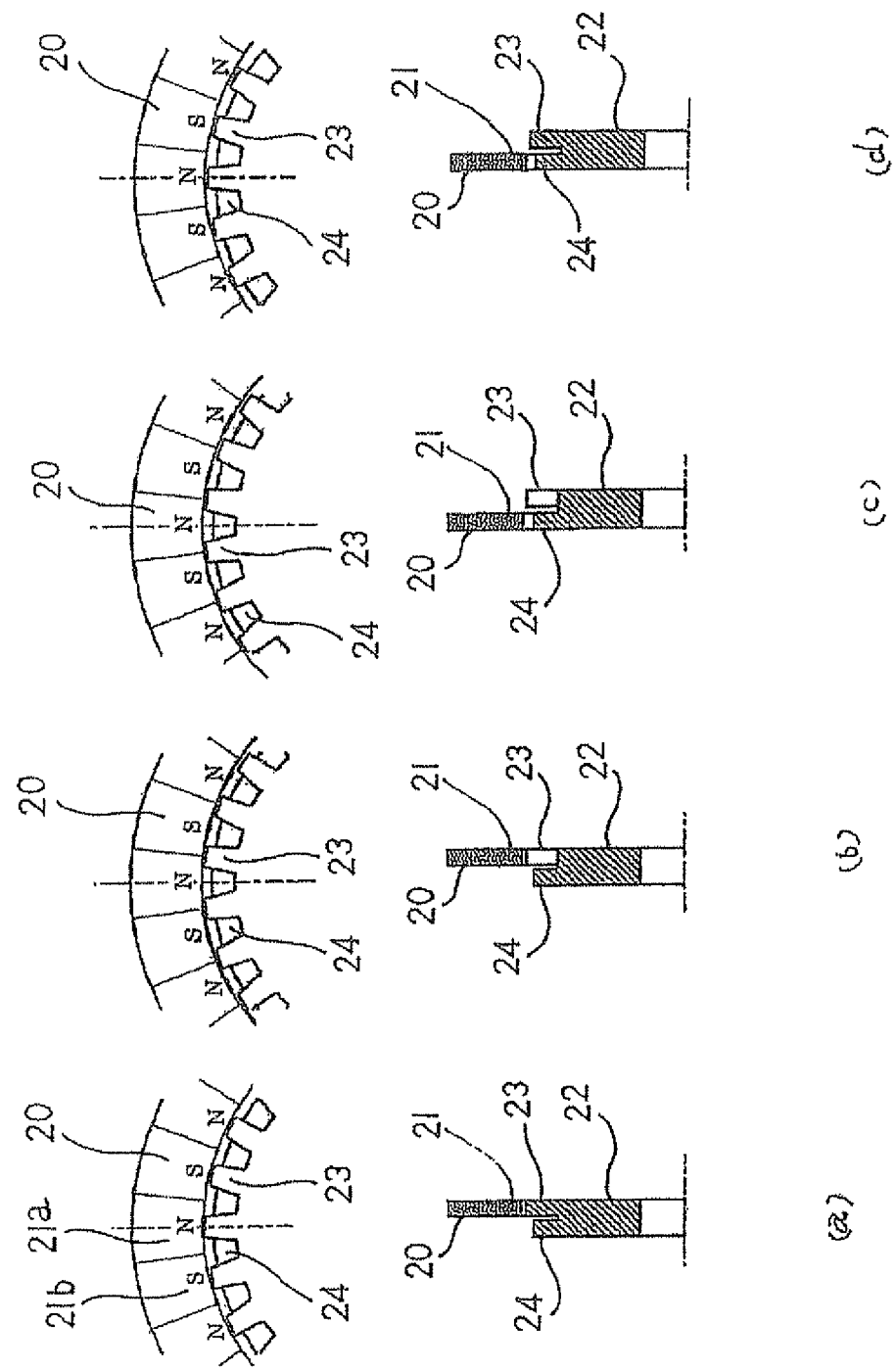
FIG. 12 is an explanatory drawing showing a torque transmission operation in another mode of the torque transmission device.

This embodiment shown in FIG. 12 is a torque transmission device having a mode in which the yoke rotating body 22 is provided on the inner side and the magnetic pole rotating body 20 is provided on the outer side.

The magnetic pole rotating body 20 is formed with magnetic pole tooth-shaped portions 21a, 21b magnetized alternately with N-pole and S-pole at intervals on the inner periphery of a hollow member as shown in FIG. 12.

Arranged rotatably on the outer periphery of the yoke rotating body 22 are tooth-shaped portions 23 having a tooth shape so as to oppose the magnetic pole tooth-shaped portions 21a, 21b at a slight distance from the inner peripheries of the magnetic pole tooth-shaped portions 21a, 21b of the magnetic pole rotating body 20, and secured on the side thereof via a magnetic body is the side magnetic body 24 having an outer peripheral surface and being arranged rotatably at a distance in the radial direction wider than the slight distance. In FIG. 12, the tooth-shaped portions 23 and the outer peripheral portion of the side magnetic body 24 are provided at a distance, the side magnetic body 24 may be secured directly to the side surfaces of the tooth-shaped portions 23 as described above.

Referring now to FIG. 12, an operation of the torque transmission device will be described.

(a) shows a state in which the magnetic pole tooth-shaped portions 21 of the magnetic pole rotating body 20 on the outside and the tooth-shaped portions 23 of the yoke rotating body 22 on the inside oppose to each other. The magnetic attracting force between the magnetic pole tooth-shaped portions 21 and the tooth-shaped portions 23 is strongest at this position.

(b) shows a state in which the magnetic pole rotating body 20 and the yoke rotating body 22 rotate with respect to each other by an application of a load torque exceeding a torque transmissible by the magnetism to between the magnetic pole rotating body 20 and the yoke rotating body 22, and the magnetic pole tooth-shaped portions 21 and the tooth-shaped portions 23 are shifted in the circumferential direction (Actually, these members do not stop at this position, but slide and transit to a state in the drawing (c) while rotating relatively with each other).

By the shifting between the magnetic pole tooth-shaped portions 21 and the tooth-shaped portions 23, the magnetic attracting force is weakened, and hence the component force in the direction of center axis of rotation of the magnetic attracting force between the magnetic pole tooth-shaped portions 21 and the side magnetic body 24 becomes greater than the component force in the direction of center axis of rotation of the magnetic attracting force between the magnetic pole tooth-shaped portions 21 and the tooth-shaped portions 23, whereby the both members move relatively with each other to positions where the magnetic pole tooth-shaped portions 21 and the circumferential (outer peripheral) surface of the side magnetic body 24 oppose to each other.

As a result of the movement described above, the magnetic pole tooth-shaped portions 21 and the side magnetic body 24 shown in the drawing (c) are moved to positions opposing to each other.

While the load torque exceeding the torque transmissible by the magnetism is applied to between the magnetic pole rotating body 20 and the yoke rotating body 22, these members continue to idle at this position (rotates with a rotational difference).

When the load torque is reduced, the component force of the circumferential direction of the magnetic attracting force between the magnetic pole tooth-shaped portions 21 and the tooth-shaped portions 23 is larger than the circumferential component force of the magnetic attracting force between the magnetic pole tooth-shaped portions 21 and the side magnetic body 24. Therefore, the magnetic pole tooth-shaped portions 21 and the tooth-shaped portions 23 rotate relatively in the direction of getting closer to each other, and the both members rotate relatively toward a state shown in the drawing (d). Consequently, the component force in the direction of center axis of rotation of the magnetic attracting force between the magnetic pole tooth-shaped portions 21 and the tooth-shaped portions 23 becomes greater than the component force in the direction of center axis of rotation of the magnetic attracting force between the magnetic pole tooth-shaped portions 21 and the side magnetic body 24, and the both members move relatively with each other to positions shown in the drawing (a).

Fourth Embodiment

Figure 13:
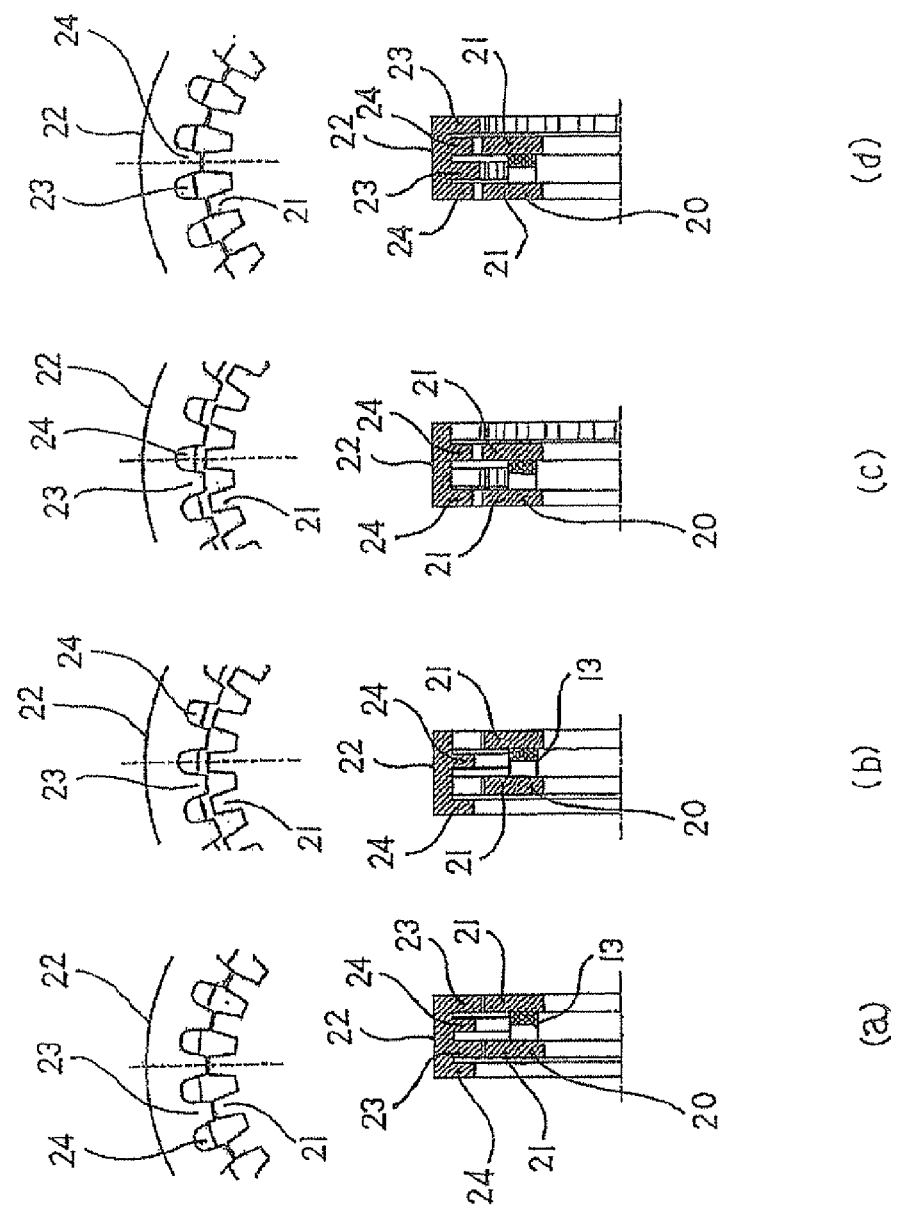
FIG. 13 is an explanatory drawing showing a torque transmission operation in another mode of the torque transmission device.
Figure 14:
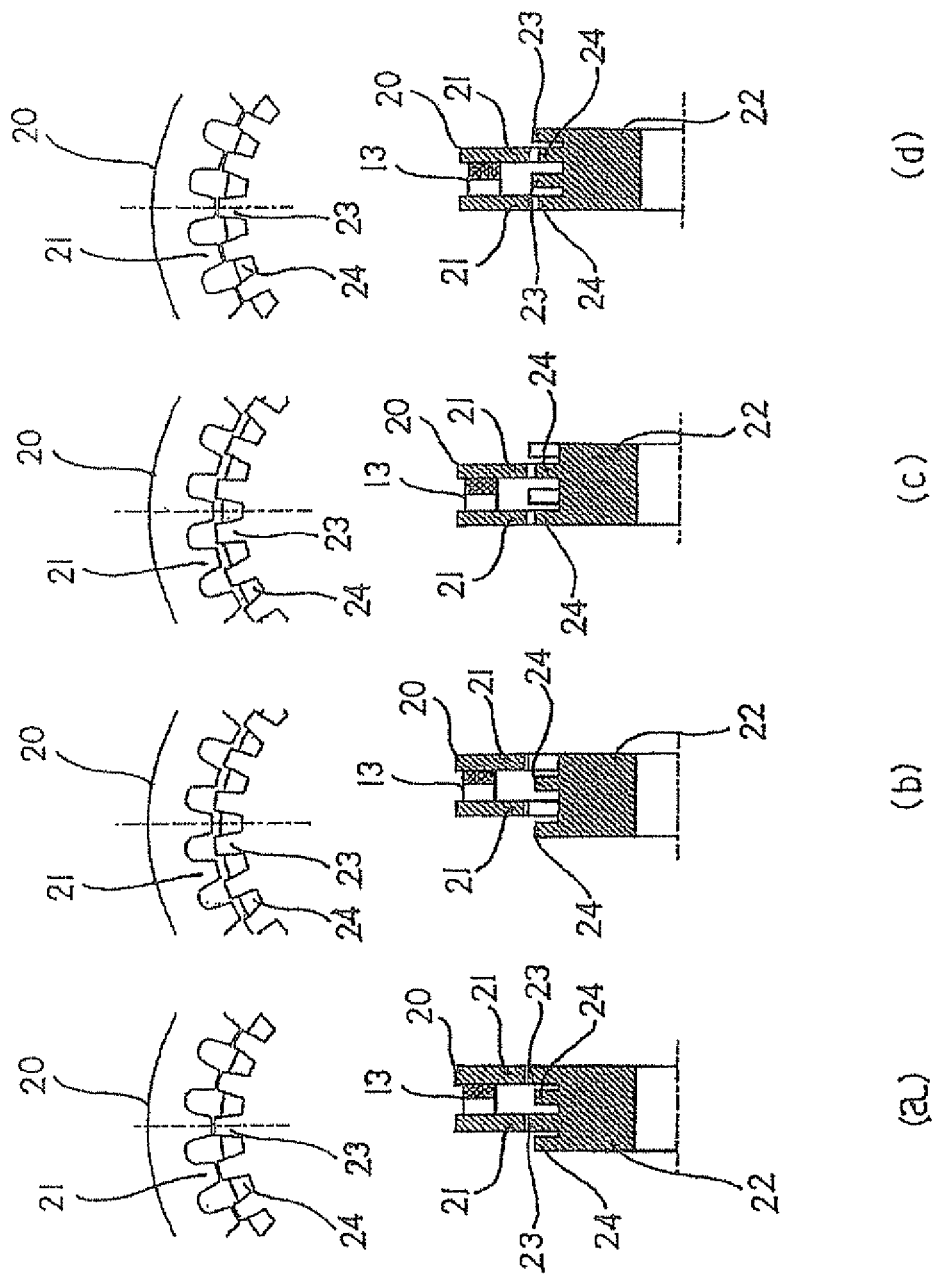
FIG. 14 is an explanatory drawing showing a torque transmission operation in another mode of the torque transmission device.

FIG. 13 shows an embodiment in which plural sets of rows of the magnetic pole tooth-shaped portions 21, the rows of the tooth-shaped portions 23, and the rows of the side magnetic body 24 are provided.

The magnetic pole rotating body 20 provided with two rows of the magnetic pole tooth-shaped portions 21 is arranged on the inner side, the yoke rotating body rotating body 22 is arranged on the outer side thereof, and the respective rotating bodies are supported so as to be rotatable and movable relatively in the direction of center axis of rotation.

The two rows of the tooth-shaped portions 23 of the yoke rotating body 22 are arranged on the outside of the magnetic pole tooth-shaped portions 21 so as to oppose the two rows of the magnetic pole tooth-shaped portions 21, and the side magnetic bodies 24 are arranged on the side of the two rows of the tooth-shaped portions 23 of the yoke rotating body 22.

The magnetic pole rotating body 20 includes a magnetic body having two doughnut disks having tooth-shaped projections formed radially outward at regular intervals in the circumferential direction on the outer sides thereof and a ring-shaped permanent magnet having an N-pole at one end and an S-pole at the other end in the axial direction secured between these two doughnut disks.

The yoke rotating body 22 includes the tooth-shaped portions 23 formed of magnetic members (silicon steel plate) with tooth-shaped projections formed on an inner side of a doughnut disk radially inwardly at regular intervals in the circumferential direction so as to oppose the magnetic pole tooth-shaped portions 21 and the side magnetic bodies 24 formed of a doughnut disk-shaped magnetic body having an inner periphery larger than the diameter of the inner periphery of the distal ends of the tooth-shaped portions 23 and secured to the side of the tooth-shaped portions 23 at a slight distance. As shown in FIG. 13, the tooth-shaped portions 23, the side magnetic bodies 24, the tooth-shaped portions 23, and the side magnetic bodies 24 are arranged in sequence from the right, the distance between the rows of the tooth-shaped portions 23 and the tooth-shaped portions 23, and the distance between the side magnetic bodies 24 and the side magnetic bodies 24 are the same as the distance between the two rows of the magnetic pole tooth-shaped portions 21 of the magnetic pole rotating body 20 respectively, so that the magnetic pole tooth-shaped portions 21 and the tooth-shaped portions 23 of the yoke rotating body 22, and the magnetic pole tooth-shaped portions 21 and the inner periphery of the side magnetic bodies 24 oppose to each other.

Also, the tooth-shaped portions 23 and the side magnetic bodies 24 are secured respectively via the magnetic bodies so that the opposed two rows of magnetic pole tooth-shaped portions 21 and the tooth-shaped portions 23 of the yoke rotating body 22, or the magnetic pole tooth-shaped portions 21 and the inner periphery of the side magnetic bodies 24 form magnetic circuits via air gaps respectively.

In the drawing, although the tooth-shaped portions 23 and the side magnetic bodies 24 are provided at a distance, the side magnetic bodies 24 may be secured directly to the side surfaces of the tooth-shaped portions 23.

Subsequently, the operation will be described. In FIG. 13, (a) shows a state in which the magnetic pole tooth-shaped portions 21 and the tooth-shaped portions 23 of the yoke rotating body 22 oppose to each other. The rotating torque is transmitted between the magnetic pole rotating body 20 and the yoke rotating body 22 by the magnetism of the permanent magnet. The two sets of the magnetic pole tooth-shaped portions 21 and the two sets of the tooth-shaped portions 23 of the yoke rotating body 22 excited by the permanent magnet form the magnet circuits via the air gaps of the opposed tooth-shaped distal ends and are magnetically coupled strongly.

(b) shows a state in which the magnetic pole rotating body 20 and the yoke rotating body 22 rotate with respect to each other by the load torque exceeding a torque transmittable by a coupling force in (a) to between the magnetic pole rotating body 20 and the yoke rotating body 22, and the magnetic pole tooth-shaped portions 21 and the tooth points of the tooth-shaped portions 23 are shifted in the circumferential direction (Actually, these members do not stop at this position, but slide and transit to a state in the drawing (c) while rotating relatively to each other). By the shifting between the magnetic pole tooth-shaped portions 21 and the tooth-shaped portions 23, the component force in the direction of center axis of rotation of the magnetic attracting force between the magnetic pole tooth-shaped portions 21 and the side magnetic bodies 24 becomes greater than the component force in the direction of center axis of rotation of the magnetic attracting force between the magnetic pole tooth-shaped portions 21 and the tooth-shaped portions 23, whereby the both members move relatively with each other to positions where the magnetic pole tooth-shaped portions 21 and the circumferential (inner peripheral) surface of the side magnetic bodies 24 oppose to each other.

As a result of the movement described above, two sets of the magnetic pole tooth-shaped portions 21 and two sets of the side magnetic bodies 24 shown in the drawing (c) are moved to positions opposing each other.

While the load torque exceeding the torque transmissible by the magnetism is applied to between the magnetic pole rotating body 20 and the yoke rotating body 22, these members continue to idle at this position (rotates with a rotational difference).

When the load torque is reduced, the component force in the circumferential direction of the magnetic attracting force between the magnetic pole tooth-shaped portions 21 and the tooth-shaped portions 23 is larger than the circumferential component force of the magnetic attracting force between the magnetic pole tooth-shaped portions 21 and the side magnetic bodies 24. Therefore, the magnetic pole tooth-shaped portions 21 and the tooth-shaped portions 23 rotate relatively in the direction of getting closer to each other, and the magnetic pole tooth-shaped portions 21 and the tooth-shaped portions 23 shown in the drawing (d) get close to each other.

The component force in the direction of center axis of rotation of the magnetic attracting force between the magnetic pole tooth-shaped portions 21 and the tooth-shaped portions 23 becomes greater than the component force in the direction of center axis of rotation of the magnetic attracting force between the magnetic pole tooth-shaped portions 21 and the side magnetic bodies 24, and the both members move relatively with each other to positions shown in the drawing (a).

Fifth Embodiment

Subsequently, another embodiment having plural sets of rows of the magnetic pole tooth-shaped portions 21, the rows of the tooth-shaped portions 23 of the yoke rotating body 22, and the rows of the side magnetic body 24 will be described.

The magnetic pole rotating body 20 provided with two rows of the magnetic pole tooth-shaped portions 21 is arranged on the outer side, the yoke rotating body 22 is arranged on the inner side thereof, and the respective rotating bodies are supported so as to be rotatable and movable relatively in the direction of center axis of rotation.

Figure 15:
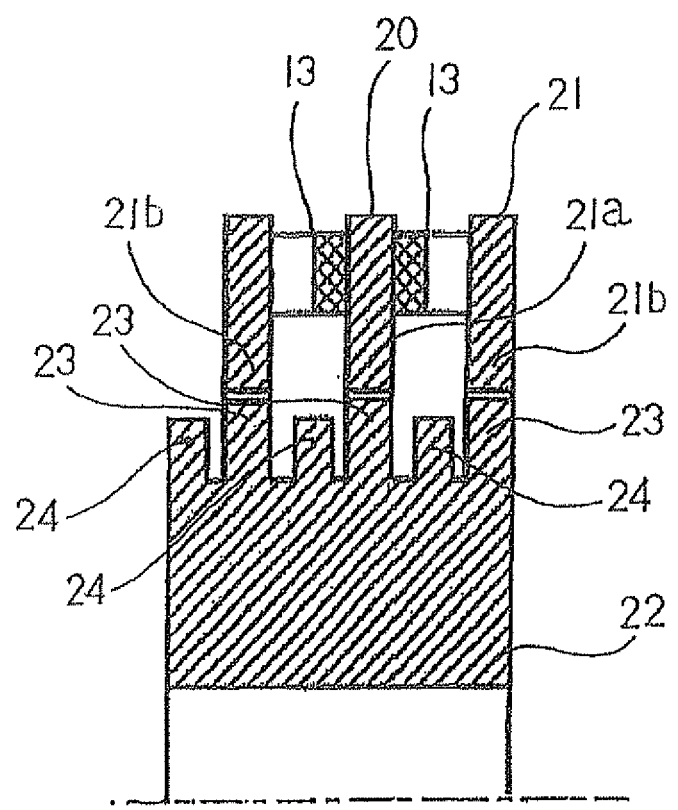
FIG. 15 is a cross-sectional view of a mode in which the magnetic poles, side magnetic bodies and yoke rotating bodies are provided in three rows.

FIG. 15 shows an embodiment in which three rows of the magnetic pole tooth-shaped portions 21, the yoke rotating body 22 and the tooth-shaped portions 23 of the yoke rotating body 22 are provided.

As shown in the drawing, the permanent magnets 13 are arranged between the three rows of the magnetic pole tooth-shaped portions 21 with the magnetic poles directed on the opposite direction. Assuming that the tooth-shaped portions 21a at the center are a row of the N-pole, the both side tooth-shaped portions 21b on both sides are excited with the magnetic poles of the rows of the S-pole.

Other configuration and the operation are the same as the first embodiment.

Sixth Embodiment

The torque transmission device described in the first embodiment includes the low-torque input means configured to rotate the sun gear shaft 7 at a high speed by the rotation of the carrier 2 of the planetary gear mechanism fixed to the input shaft 1 via the planetary gear 3, and the high-torque input means 15 coupled to the carrier 2 and rotated thereby. However, this embodiment is characterized by a configuration in which high-torque input means is provided on one side of a hollow rotating body as the input means, the carrier 2 is provided on the other side, and the low-torque input means configured to rotate a sun gear shaft at a high speed by the rotation of the carrier via the planetary gear is provided.

Figure 16:
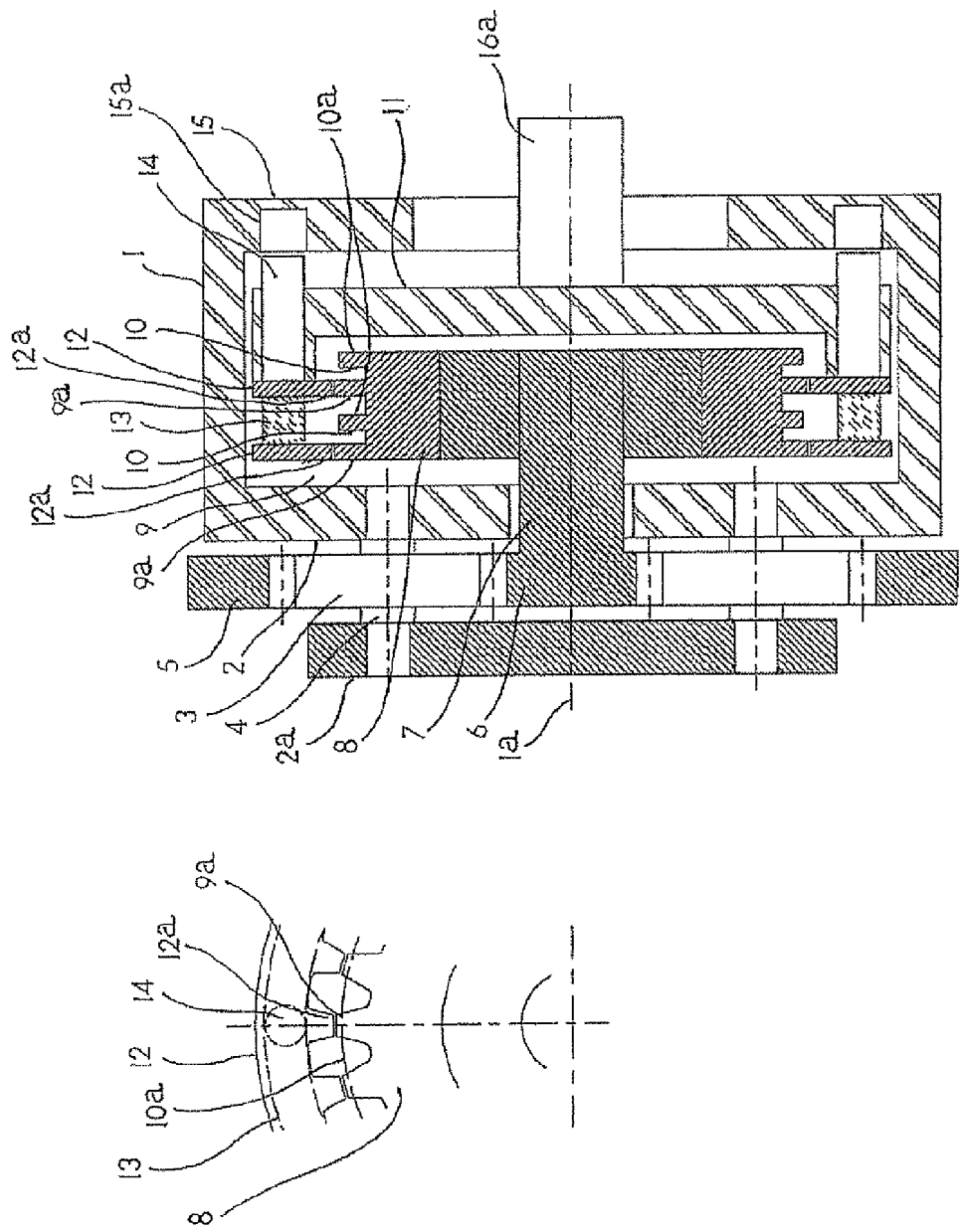
FIG. 16 depicts a general configuration drawing of the magnetic clutch apparatus in another mode using a torque transmission device according to the present invention, and depicts an explanatory drawing showing the positions of the tooth-shaped portions and the side magnetic bodies.

Referring now to FIG. 16, the description will be given below.

Reference numeral 1 designates a hollow shaft-shaped input means, reference numeral 1a designates a center axis of rotation of the input means, and the input means 1 is rotated by a pulley, a gear or the like, not shown.

Reference numeral 2 designates a carrier of the planetary gear mechanism integrally secured to one end of the hollow shaft-shaped input means 1 and constituting a speed increasing gear mechanism, reference numeral 2a designates a carrier coupled to the carrier 2, reference numeral 3 designates a planetary gear of the planetary gear mechanism attached between the carriers 2, 2a via a shaft, reference numeral 4 designates a planetary gear shaft attached between the carriers 2, 2a and configured to allow a rotatable attachment of the planetary gear 3 via the shaft, reference numeral 5 designates a ring gear in which the planetary gear 3 engages in an internal contact therewith, reference numeral 6 designates a sun gear provided on the sun gear shaft 7, and reference numeral 7 designates the sun gear shaft. The planetary gear 3 engages the sun gear 6 in an external contact therewith, and rotates the sun gear shaft 7 at a higher speed. The sun gear shaft 7 is supported by bearing means, not shown, via the shaft which is rotatable but immovable in the axial direction. Reference numeral 8 designates low-torque input means secured to the sun gear shaft 7, coupled to the input means 1 via the planetary gear mechanism, and rotates at a speed higher than that of the input means 1. Reference numeral 9 designates a yoke rotating body (yoke) having the pair of tooth-shaped portions 9a, 9a arranged on the outer peripheral portion of the low-torque input means 8 at regular intervals, reference numeral 10 designates side magnetic bodies including a pair of side magnetic bodies 10a, 10a having an outer peripheral surface of a diameter smaller than the outer diameter formed by the distal ends of the tooth-shaped portions of the tooth-shaped portions 9a, reference numeral 11 designates output rotating means including a pair of magnetic pole rotating bodies 12 described later, the permanent magnet 13, and the clutch engaging projection 14 provided at an end portion of the magnetic pole rotating body 12.

Reference numeral 12 designates magnetic pole rotating bodies secured to both side surfaces of the permanent magnet 13, and including tooth-shaped portions 12a arranged on the inner periphery thereof in plural rows at regular intervals such that the distal ends thereof are capable of opposing the tooth-shaped portions 9a of the yoke rotating bodies 9.

Reference numeral 13 designates a permanent magnet, having an N-pole on one side surface and an S-pole on the other side surface. The permanent magnet 13 does not have to be formed integrally, and may be divided in the circumference direction or the thickness direction as needed, and has a configuration which is capable of exciting the tooth-shaped portions 12a of the magnetic pole rotating bodies 12 and forming the magnetic poles.

Reference numeral 14 designates a clutch engaging projection secured to the side surface of the magnetic pole rotating body 12, reference numeral 15 designates high-torque rotating means secured to the other end of the input means 1 and rotates at the same speed as the input means, and reference numeral 15a designates a torque transmitting groove configured to engage the clutch engaging projection 14 at the time of high-load rotation.

The clutch engaging projection 14 and the torque transmitting groove 15a form a claw clutch mechanism.

Reference numeral 16 designates an output shaft fixed to the output rotating means 11. The tooth-shaped portions 12a of the magnetic pole rotating bodies 12 are magnetically coupled to the tooth-shaped portions 9a of the yoke rotating bodies 9 at the time of the low-load high-speed rotation, and to the side magnetic bodies 10a at the time of the high-load low-speed rotation. In the drawing, although the tooth-shaped portions 9a and the side magnetic bodies 10 are provided at a distance, the side magnetic bodies 10 may be arranged in tight contact with the side surfaces of the tooth-shaped portions 9a.

Also, the switching operation of the magnetic clutch mechanism in this embodiment is the same as the operation described in paragraph numbers [0021] to [0028], and hence the description will be omitted.

FIG. 17 shows a configuration in which the small-diameter side magnetic body 10b having an outer peripheral surface of a diameter further smaller than the side magnetic bodies 10a is provided between the tooth-shaped portions 9a of the yoke rotating bodies 9 and the side magnetic bodies 10a.

By the provision of the side magnetic body 10b having a diameter further smaller than the side magnetic bodies 10a on the side magnetic bodies 10, the load torque between the magnetic pole rotating bodies 12 and the yoke rotating bodies 9 is increased at the time of the low-load high-speed rotation, and attracting forces of the magnetic pole rotating bodies 12 are absorbed by being dispersed to the side magnetic bodies 10a and the small-diameter side magnetic bodies 10b when the magnetic pole rotating bodies 12 are attracted toward the side magnetic bodies 10 and move along the axis of rotation 1a. Therefore, the attracting force between the both members become gentle, the attracting force in the axial direction of the side magnetic bodies 10 is weakened, and the amount of deviation of the magnetic pole rotating bodies 12 in the direction of the axis of rotation can be increased.

In this embodiment, only one the small-diameter side magnetic body 10b is provided. However, two or more of the small-diameter side magnetic bodies 10b which are reduced in diameter step-by-step may be provided, or a small diameter portion formed continuously can be provided as well.

Figure 18:
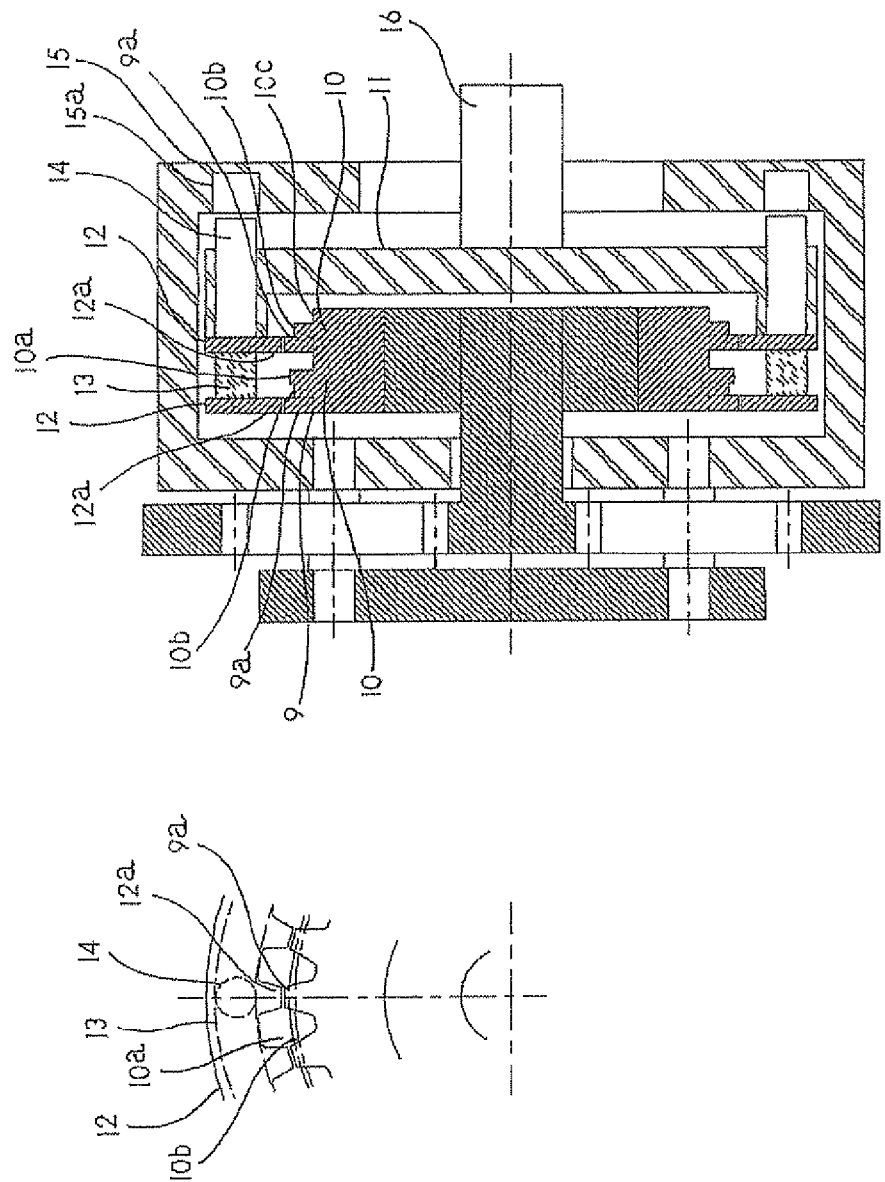
FIG. 18 depicts a general configuration drawing of a mode in which one side magnetic body is provided on one of the sides of the tooth-shaped magnetic bodies in FIG. 17, and depicts an explanatory drawing showing the positions of the tooth-shaped portions and the side magnetic bodies.

FIG. 18 shows a mode in which the small-diameter side magnetic body 10b and a further smaller-diameter side magnetic body 10c are provided on one of the tooth-shaped portions 9a of the yoke rotating bodies 9, and the small-diameter side magnetic body 10b and the large-diameter side magnetic body 10a on the other of the tooth-shaped portions 9a. The mode of the side magnetic bodies shown in FIG. 18 is different from the side magnetic bodies shown in FIG. 17 in that the one of the side magnetic bodies is composed of the small-diameter side magnetic body 10b and the further smaller-diameter side magnetic body 10c. In this manner, various modes of the side magnetic bodies 10 can be applied to the plural rows of the tooth-shaped portions 9a and, for example, it is also possible to provide only one row of the side magnetic bodies 10 or a configuration in which the side magnetic bodies 10 having different shapes are combined is also applicable.

Figure 19:
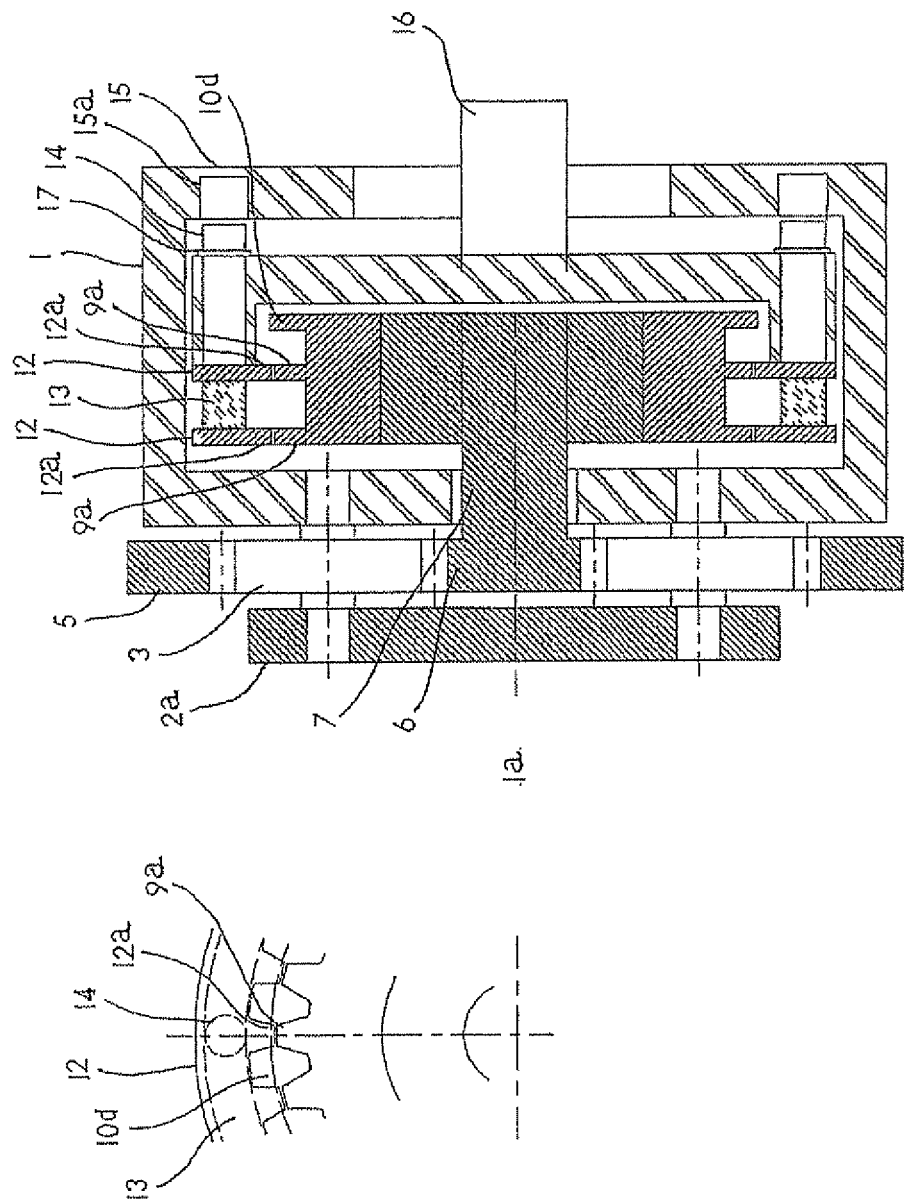
FIG. 19 depicts a general configuration drawing of a mode in which a large-diameter side magnetic body is provided on the sides of the tooth-shaped magnetic bodies, and depicts an explanatory drawing showing the positions of the tooth-shaped portions and the side magnetic bodies.
Figure 20:
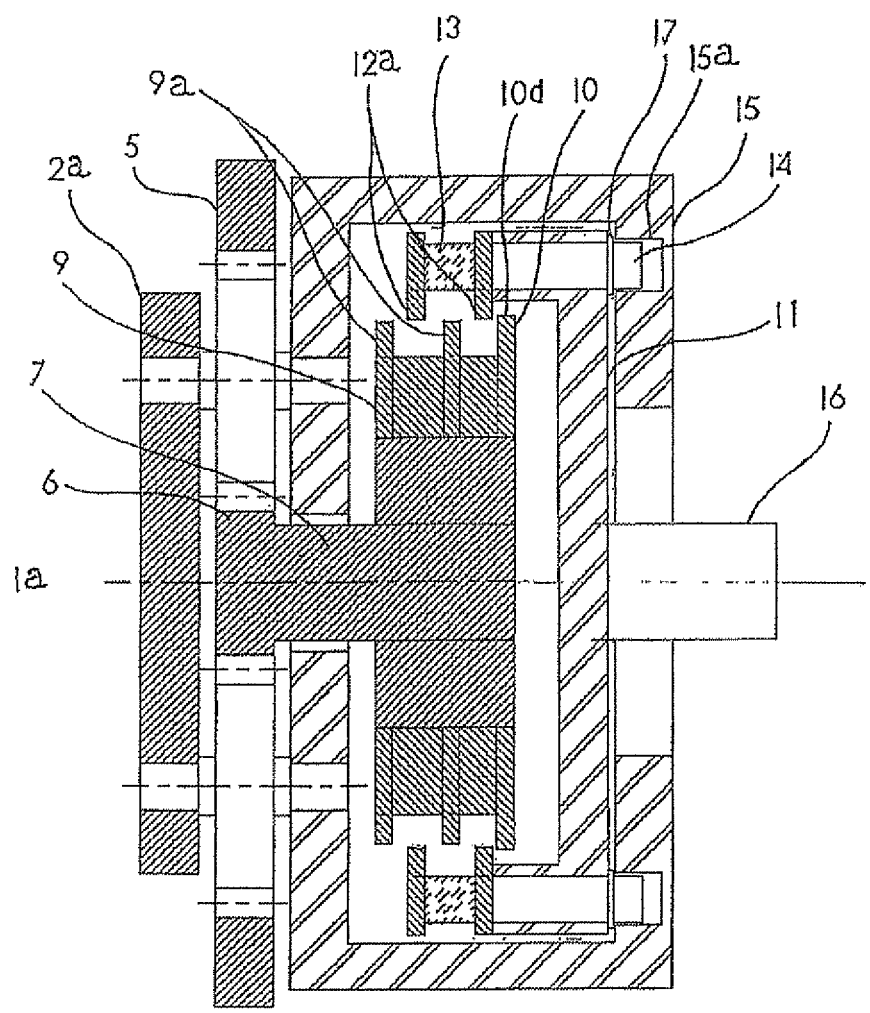
FIG. 20 is a general configuration of a mode in which the large diameter side magnetic bodies are provided on the sides of the tooth-shaped magnetic bodies.

FIGS. 19, 20 show other modes of the side magnetic bodies 10. In the drawings, the side magnetic body 10 is a large-diameter side magnetic body 10d having a larger diameter than the diameter of the tooth-shaped portions 9a, and an outer diameter portion formed by distal ends of the large-diameter side magnetic body 10d projects radially inwardly of the magnetic pole rotating bodies 12 with respect to the distal end portions of the tooth-shaped portions 12a of the magnetic pole rotating bodies 12. FIG. 19 shows a state of the low-load high-speed rotation in which the magnetic pole tooth-shaped portions 12a and the tooth-shaped portions 9a of the yoke rotating bodies 9 engage, and FIG. 20 show a state of the high-load low-speed rotation in which the claw clutch 14 engages the torque transmitting groove 15a of the high-torque input means 15. Reference numeral 17 designates a stopper which prevents the tooth-shaped portions 12a of the magnetic pole rotating bodies 12 from coming into contact with the large-diameter side magnetic bodies 10d at the time of operation in which the claw clutch 14 engages the torque transmitting groove 15a.

Instead of the stopper 17, slide stoppers (not shown) may be provided on bearing portions of the magnetic pole rotating bodies 12 to prevent the contact between the magnetic pole 12 and the large-diameter side magnetic body 10d.

The side magnetic bodies 10 shown in FIG. 16 to FIG. 20 are formed integrally with the yoke rotating body 19. However, the side magnetic bodies 10 formed as separate members may be secured to the yoke rotating body 19.

Although the shape of the side magnetic body is preferably a hollow circular shape, shapes other than the circular shape are also applicable.

The configuration of the magnetic pole of the magnetic pole rotating body and the tooth-shaped portions of the yoke rotating body are not limited to the configuration in the first to sixth embodiments and, for example, the tooth-shaped portions of the both may be opposed in the axial direction instead of the configuration opposing in the radial direction. In other words, the invention needs only to be a configuration in which by providing the yoke rotating body having the tooth-shaped portions which are magnetically coupled to the plural magnetic poles of the magnetic pole rotating body and causing the both to rotate relative to each other when the load torque exceeding the magnetism working between the both is applied, the strong magnetic coupling force between the both is cancelled, and, instead, the magnetic pole rotating body is attracted by the side magnetic body arranged on the side of the tooth shaped portion of the yoke rotating body by the magnetism and arranged so as to be displaceable in the direction of center axis of rotation and, specifically, the mode in which the magnetic pole rotating body is attracted to the side magnetic body by a magnetism of its own is preferable because the configuration is simple.

The yoke rotating body and the side magnetic body are preferably formed of a soft magnetic material so that the magnetic circuit can be switched easily.

The mode in which the permanent magnet is arranged on the side of the yoke rotating body as well to enhance the torque transmissible by the magnetisms between the both is also applicable.

REFERENCE NUMERALS 8 low-torque input means
9, 9a 22 yoke rotating body
9a, 23 tooth-shaped portion
10, 10a, 10b, 10c, 10d, 24 side magnetic body
10a circular-shaped portion
11 output rotating means
12, 20 magnetic pole rotating body
12a, 21, 21a, 21b tooth-shaped portion
13 permanent magnet
14 claw clutch engaging projection
15 high-torque input means
15a torque transmitting groove

The invention claimed is:

1. A torque transmission device comprising:
a magnetic pole rotating body having magnetic poles arranged in a row on a circumference thereof;
a yoke rotating body configured to rotate about the same center axis of rotation as the magnetic pole rotating body and including tooth-shaped portions arranged in a row so as to oppose the magnetic poles;
a side magnetic body formed of a magnetic material provided on the side of the tooth-shaped portions of the yoke rotating body;
an output rotating means which is movable in a direction of the center axis of rotation and is formed by at least one of the magnetic pole rotating body or the yoke rotating body;
a low-torque input rotating means formed by at least the other one of the magnetic pole rotating body or the yoke rotating body; and
a high-torque input means configured to engage the output rotating means so as to be capable of transmitting torque by an operation of the output rotating means moving in the direction of the center axis of rotation, and to transmit a torque exceeding a transmission torque transmissible by a magnetic attracting force between the magnetic pole rotating body and the yoke rotating body,
wherein the magnetic pole rotating body and the yoke rotating body are supported so as to be rotatable about the direction of the center axis of rotation and so as to allow the magnetic poles and the side magnetic body to be relatively movable in the direction toward and away from each other along the center axis of rotation, and
wherein when a load torque exceeding the transmission torque transmissible by the magnetic attracting force is applied between the magnetic pole rotating body and the yoke rotating body,
the magnetic pole rotating body and the yoke rotating body relatively rotate and a coupling force applied between the opposed magnetic poles and the tooth-shaped portions is weakened, so that a component force in the direction of the axis of rotation of the magnetic attracting force applied between the magnetic poles and the side magnetic body becomes greater than a component force in the direction of axis of rotation of the magnetic attracting force applied to the magnetic pole rotating body and the tooth-shaped portion, and the magnetic poles move relatively to the positions closer to the side magnetic body along the center axis of rotation.

2. The torque transmission device according to claim 1, wherein when the load torque applied to the magnetic pole rotating body and the yoke rotating body is reduced to a level lower than the magnetic attracting force applied between the magnetic poles and the yoke rotating body, the magnetic poles move relatively to positions opposing the tooth-shaped portions of the yoke rotating body.

3. The torque transmission device according to claim 1, wherein the side magnetic body includes a circumferential surface concentric with a circumferential surface formed by distal ends of the tooth-shaped portions of the yoke rotating body and, when a load torque exceeding the rotating torque transmissible by the magnetic attracting force is applied between the magnetic pole rotating body and the yoke rotating body, the magnetic poles move relatively to positions opposing the circumferential surface of the side magnetic body along the center axis of rotation.

4. The torque transmission device according to claim 1, wherein a plurality of sets of a row of the magnetic poles of the magnetic pole rotating body, a row of the tooth-shaped portions of the yoke rotating body, and a row of the side magnetic bodies are provided, respectively.

5. The torque transmission device according to claim 1, wherein the magnetic poles of the magnetic pole rotating body are arranged so as to oppose an outer peripheries of the tooth-shaped portions of the yoke rotating body.

6. The torque transmission device according to claim 1, wherein the magnetic pole rotating body includes a pair of hollow disks having tooth portions arranged on inner circumference thereof at regular intervals and a hollow disk-shaped permanent magnet secured between the hollow disks and arranged so that distal ends of the tooth portions of one of the pair of hollow disks becomes a row of N-poles and distal ends of the tooth portions of the other one of those becomes a row of S-poles.

7. The torque transmission device according to claim 1, wherein the tooth-shaped portions of the yoke rotating body are arranged so as to oppose an outer periphery of the magnetic poles of the magnetic pole rotating body.

8. The torque transmission device according to claim 1, wherein the output rotating means and the high-torque input means are configured to engage by a claw clutch.

9. The torque transmission device according to claim 1, wherein a carrier of a planetary gear mechanism is coupled to the high-torque input means and a sun gear shaft of the planetary gear mechanism is coupled to the low-torque input means.

10. The torque transmission device according to claim 1, wherein a small-diameter side magnetic body having a diameter smaller than the side magnetic body is provided between the tooth-shaped portions of the yoke rotating body and the side magnetic body.

11. The torque transmission device according to claim 5, wherein at least one side magnetic body is a large-diameter side magnetic body having a diameter larger than the diameter of the tooth-shaped portions of the yoke rotating body.

* * * * *